US012605573B2

(12) United States Patent
Mun et al.

(10) Patent No.: US 12,605,573 B2
(45) Date of Patent: Apr. 21, 2026

(54) MASK APPARATUS

(71) Applicant: LG Electronics Inc., Seoul (KR)

(72) Inventors: Yeongcheol Mun, Seoul (KR); Dongkwon An, Seoul (KR); Sejeong Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 619 days.

(21) Appl. No.: 18/081,256

(22) Filed: Dec. 14, 2022

(65) Prior Publication Data

US 2024/0042248 A1 Feb. 8, 2024

(30) Foreign Application Priority Data

Aug. 2, 2022 (KR) ........................ 10-2022-0096140

(51) Int. Cl.
*A62B 18/00* (2006.01)
*A41D 13/11* (2006.01)
(Continued)

(52) U.S. Cl.
CPC ............ *A62B 18/006* (2013.01); *A41D 13/11* (2013.01); *A62B 7/10* (2013.01); *A62B 9/02* (2013.01);
(Continued)

(58) Field of Classification Search
CPC .... A62B 7/08; A62B 7/10; A62B 9/04; A62B 18/006; A62B 18/02; A62B 18/025;
(Continued)

(56) References Cited

U.S. PATENT DOCUMENTS

2011/0126713 A1* 6/2011 Legare .................. B01D 46/30 55/467
2018/0001120 A1* 1/2018 Virr ...................... B01D 46/009
(Continued)

FOREIGN PATENT DOCUMENTS

CN 107929969 A * 4/2018 ........... A62B 18/025
CN 113749327 A * 12/2021 ............ A41D 27/00
(Continued)

OTHER PUBLICATIONS

Extended European Search Report in European Appln. No. 23159970.5, mailed on Jan. 31, 2024, 3 pages.
(Continued)

*Primary Examiner* — Tu A Vo
(74) *Attorney, Agent, or Firm* — Fish & Richardson P.C.

(57) ABSTRACT

A mask apparatus that includes a mask body including a front body; and a rear body coupled to a rear surface of the front body and from which a pair of accommodation portions protrudes forward; a face guard coupled to a rear surface of the rear body to contact a user's face and define a breathing space therein; a fan module seated in the accommodation portion; a flow guide provided at a rear surface of the fan module and defining a portion of a discharge port communicating with the breathing space; a filter seated on the flow guide; and a filter housing rotatably coupled to the rear body to cover the filter, in which a guide shoulder is rounded and protrudes from the side of the flow guide, and in which guide grooves are defined on the side of the filter housing.

14 Claims, 26 Drawing Sheets

(51) Int. Cl.

| | |
|---|---|
| ***A62B 7/10*** | (2006.01) |
| ***A62B 9/02*** | (2006.01) |
| ***A62B 18/02*** | (2006.01) |
| ***A62B 18/08*** | (2006.01) |
| ***A62B 18/10*** | (2006.01) |
| ***A62B 23/02*** | (2006.01) |

(52) U.S. Cl.

CPC ............ *A62B 18/025* (2013.01); *A62B 18/08* (2013.01); *A62B 18/10* (2013.01); *A62B 23/02* (2013.01); *A62B 23/025* (2013.01)

(58) Field of Classification Search

CPC ... A62B 18/08; A62B 23/00–025; A62B 7/00; A62B 23/05; A41D 13/11–1192

See application file for complete search history.

(56) References Cited

U.S. PATENT DOCUMENTS

| | | | | |
|---|---|---|---|---|
| 2018/0361295 | A1* | 12/2018 | Legare | B01D 46/0005 |
| 2020/0164236 | A1* | 5/2020 | Seo | A62B 18/006 |
| 2021/0379419 | A1 | 12/2021 | Kim et al. | |
| 2021/0402223 | A1* | 12/2021 | Choi | A61B 5/6803 |

FOREIGN PATENT DOCUMENTS

| | | | | | |
|---|---|---|---|---|---|
| CN | 113750385 | A | | 12/2021 | |
| CN | 114288579 | A | | 4/2022 | |
| CN | 114558259 | A | * | 5/2022 | A62B 18/02 |
| CN | 216725565 | U | | 6/2022 | |
| DE | 102021125599 | A1 | * | 4/2022 | A62B 18/084 |
| EP | 2913083 | A1 | | 9/2015 | |
| EP | 3398657 | | | 11/2018 | |
| JP | 2018505721 | A | * | 3/2018 | A62B 18/025 |
| KR | 200375729 | Y1 | * | 3/2005 | A62B 23/025 |
| KR | 101460942 | B1 | * | 11/2014 | A62B 23/02 |
| KR | 2016-0129562 | A | | 11/2016 | |
| KR | 10-2018-0009326 | | | 1/2018 | |
| KR | 101997813 | B1 | * | 10/2019 | A62B 23/02 |
| KR | 20210000561 | A | * | 1/2021 | A62B 7/10 |
| KR | 10-2021-0151500 | | | 12/2021 | |
| KR | 10-2021-0151512 | | | 12/2021 | |
| KR | 102352405 | B1 | * | 1/2022 | A62B 18/003 |
| KR | 10-2426354 | | | 7/2022 | |
| SG | 10202001572 | U | * | 9/2021 | |
| WO | WO 2017/004313 | | | 1/2017 | |
| WO | WO-2018094009 | A1 | * | 5/2018 | A62B 23/02 |
| WO | WO-2021167533 | A1 | * | 8/2021 | A62B 18/025 |
| WO | WO-2021182847 | A1 | * | 9/2021 | A62B 23/02 |

OTHER PUBLICATIONS

Notice of Allowance in Korean Appln. No. 10-2022-0096140, mailed on Jan. 22, 2024, 14 pages (with English translation).

Notice of Allowance in Chinese Appln. No. 202211348604.6, mailed on Jan. 30, 2026, 7 pages (with English translation).

* cited by examiner

MASK APPARATUS

CROSS-REFERENCE TO RELATED APPLICATIONS

The present application claims the benefits of priority to Korean Patent Application No. 10-2022-0096140, filed on Aug. 2, 2022 of which is incorporated herein by reference in its entirety.

THE BACKGROUND

1. The Field

The present disclosure relates to a mask apparatus.

2. Description of the Related Art

The mask may be defined as a hygiene product that can cover the user's nose and mouth so that harmful substances including germs and dust contained in the air are filtered when the user breathes in and so that spreading of the virus or bad breath emitted when the user exhales to surrounding people can be minimized.

Recently, as a virus that is highly spreadable and highly contagious has spread, it is recommended that individuals wear a mask and go out for safety in order to minimize transmission.

Currently, various types and forms of masks are on the market, and in particular, in order to minimize harmful substances contained in the air from introducing into the mask wearer's respiratory tract directly, many masks equipped with a filter module are being sold.

In addition, in order to facilitate the flow of air passing through the mask when the user breathes in or breathes out, a mask equipped with a fan is also on sale.

A conventional mask, including the mask disclosed in the published prior art EP3398657A (Apr. 21, 2021), includes a filter so that harmful substances contained in external air are filtered out and then introduce into the user's respiratory tract.

In addition, the mask is provided with a pressure detection means for detecting the pressure of the breathing space formed between the mask and the user's face, and a fan module whose rotation speed is variable according to the pressure detected by the pressure detection means, so that the mask helps the user to breathe comfortably even while the mask wears a mask.

However, most of the masks currently on the market and publicly available has a structure in which the air suction port is formed on the front surface of the mask, and the air discharge port is formed on the rear surface of the mask, specifically, the rear surface of the mask corresponding to a point close to the user's mouth or nose. Here, the front surface of the mask means a portion exposed to the outside, and the rear surface of the mask means a portion in close contact with the user's face.

In detail, the air suction port formed in the mask is generally formed on the front surface close to the center of the mask or on the front surface close to both side ends, and, in the case of the prior art, the air suction port is formed on the front surface close to both side ends of the mask.

As such, in a structure in which the air suction port is formed on the front surface of the mask and the air discharge port is formed on the rear surface of the mask, in a process that external air introduces into the mask, passes through the fan and filter, and thus is discharged to the user's respiratory tract through the air discharge port, there is a problem in that the flow conversion of air occurs excessively.

As the number of flow conversions of the suctioned air increases, the flow resistance increases, and as a result, the load of the fan increases. In addition, as the load of the fan increases, there is a problem in that the power consumption of the battery supplying power to the fan increases.

In addition, as the number of flow conversions of the suctioned air increases, there is a problem in that the flow noise increases.

In addition, since there are many case where a user wearing a mask in which the air suction port is disposed on the front surface of the mask often takes off the mask and leaves the air suction port facing upward or forward, there is a disadvantage in that the possibility of dust introducing through the air suction port is relatively high.

In addition, when the air suction port is disposed on the front surface of the mask, it may give an impression that the outer appearance is not good when worn.

In addition, when the user walks or runs while wearing the mask apparatus, since there is a high possibility that foreign substances or flies floating in front of the user are directly introduced into the suction port, there is a disadvantage in that the life of the filter is shortened and the filter replacement cycle is shortened.

In addition, a suction port cover may be mounted to prevent the air suction port from being exposed to the outside as it is, and in this case, a phenomenon that the suction port cover is separated from the mask or damaged due to external force or impact may occur.

In addition, in a case of a structure in which the suction port is not formed in the mask body, but is formed in another portion, for example, a structure in which the suction port is formed in a separate air cleaning module that is detachably or foldably coupled to the side of the mask body, there is a disadvantage in that the flow resistance significantly increases while the suctioned air suctioned into the air cleaning module reaches the discharge port formed in the center of the mask body.

THE SUMMARY

The present disclosure is proposed to improve the above disadvantages.

A mask apparatus according to an embodiment of the present disclosure in order to achieve the above object includes a mask body including a front body; and a rear body coupled to a rear surface of the front body and from which a pair of accommodation portions protrudes forward; a face guard coupled to a rear surface of the rear body to be in close contact with a user's face and having a breathing space formed therein; a fan module seated in the accommodation portion; a flow guide placed on a rear surface of the fan module and forming a portion of a discharge port communicating with the breathing space; a filter seated on the flow guide; and a filter housing rotatably connected to the rear body to cover the filter, in which the flow guide includes a mount plate covering a rear surface of a fan; a duct flange bent and extended from one end of the mount plate; upper flanges bent and extended from upper ends of the mount plate 5 and the duct flange; lower flanges bent and extended from lower ends of the mount plate and the duct flange; and a rear flange formed at an end portion of the duct flange and forming a portion of a rear surface of the mask body; in which a guide shoulder is rounded and protrudes from the duct flange, in which the filter housing includes a pair of filter frames extending in parallel in a state of facing each other; a filter cover connecting rear surfaces of the pair of filter frames; a hinge extending from an edge of each of the pair of filter frames; and a fastening hook extending from the opposite end portion of a side end portion on which the hinge is formed and caught on a filter hook, and in which guide grooves engaged with the guide shoulders are formed in the pair of filter frames, respectively.

Each of the pair of accommodation portions includes a fastening surface extending forward from a side end portion of the rear body and having a rear surface from which the filter hook protrudes; a seating surface extending from an end portion of the fastening surface toward a center of the rear body and having a rear surface on which the filter is seated; an air guide surface connecting an end portion of the seating surface and a front surface of the rear body; an upper surface connecting upper ends of the fastening surface, the seating surface, and the air guide surface to the front surface of the rear body; and a lower surface connecting lower ends of the fastening surface, the seating surface, and the air guide surface to the front surface of the rear body.

A hinge hole in the form of a long hole into which the hinge is inserted is formed in each of the upper and lower surfaces, and the hinge hole extends from a front end portion toward a rear end portion of the upper surface, and extends obliquely in a direction closer to the side end portion of the rear body toward a rear end.

An air duct is defined by the air guide surface and the duct flange, the upper flange include a mount upper flange bent and extended from the upper end of the mount plate; and a duct upper flange bent and extended from the upper end of the duct flange, the lower flange includes a mount lower flange bent and extended from the lower end of the mount plate; and a duct lower flange bent and extended from the lower end of the duct flange, and the guide shoulder is formed on the mount upper flange and the mount lower flange, respectively.

The guide shoulder and the guide groove are formed at a point closer to the hinge than the fastening hook.

The filter cover is formed with a suction port for inhaling external air, and the suction port is a set of a plurality of holes having different sizes.

The end portion of the air duct is a discharge port through which the inhaled external air is discharged to the breathing space.

According to the mask apparatus according to the embodiment of the present disclosure having the configuration as described above, the following effects are obtained.

First, since both the suction port and the discharge port of the mask apparatus are formed on the rear surface of the mask body that covers the user's face, there is an effect that the flow resistance is significantly lower than when the suction port of the mask apparatus is formed on the front surface of the mask body or other parts other than the mask body.

Second, since the suction port is not exposed to the outside while the user wears the mask apparatus, there is an advantage in that there is no need for a separate cover member to cover the suction port. Furthermore, since a separate cover member does not need to be mounted on the front surface of the mask apparatus, there is an effect in that a phenomenon that the cover member is damaged or separated by external force is not generated.

Third, since the suction port is formed on the rear surface of the mask body, there is an advantage in that, if the mask apparatus is taken off so that the front surface of the mask body faces forward or upward, it is possible to minimize the phenomenon that dust or other foreign substances are introduced into the mask apparatus through the suction port.

Fourth, since the suction port is formed on the rear surface of the mask body, the front surface of the mask apparatus is neatly processed, and there is an additional effect of increasing the purchase desire of the buyer.

Fifth, when one end of the filter housing is separated and then recoupled, there is an effect in that a phenomenon that the hook protruding from the end portion of the filter housing is damaged by the user's hand pressure is prevented.

Sixth, since the waterproof sleeve extends forward from the edge of the strap hole constituting the strap connector and a sealing cap is mounted on the inside of the waterproof sleeve, there is an advantage in that the introduction of sweat or moisture introducing through the strap hole into the mask body can be blocked.

Seventh, since the sealing cover is mounted on the end portion of the exhaust flow path guide, there is an effect in that a phenomenon that moisture penetrates through a gap generated between the exhaust flow path guide and the rear surface of the front body is prevented.

Eighth, since the curving prevention wall is formed on the indicator body constituting the indicator module, there is an effect of preventing the indicator body from being bent by the pressing force applied to the power button.

Ninth, since the curving prevention boss protrudes from the mount plate of the flow guide, there is an effect that the possibility of noise or PCB damage of the fan module due to interference between the fan blade and mount plate is improved.

THE DETAILED DESCRIPTION

Hereinafter, a mask apparatus according to an embodiment of the present disclosure will be described in detail with reference to the drawings.

Figure 1:
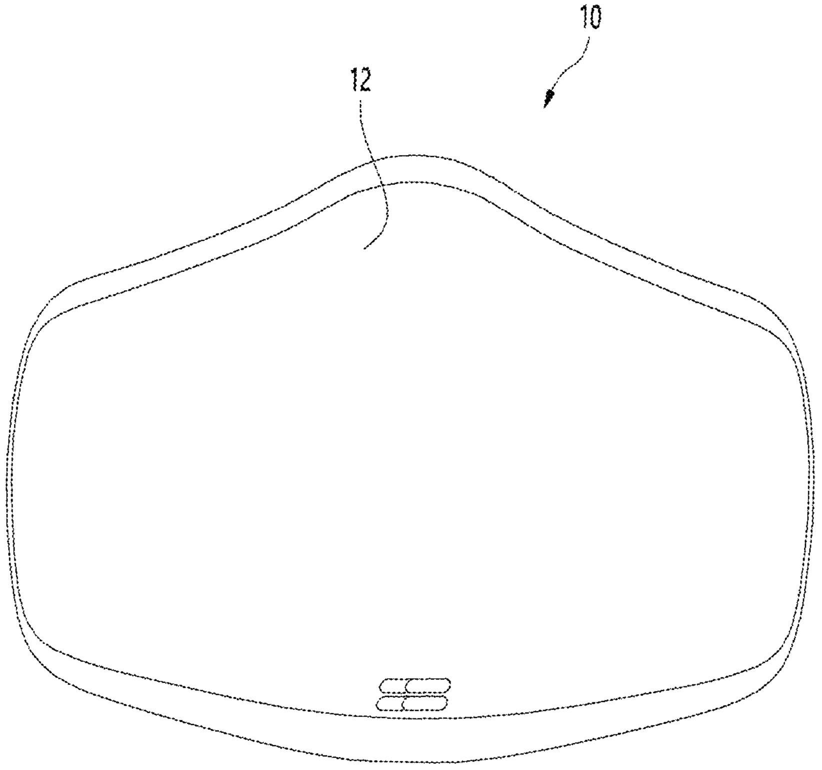
FIG. 1 is a front perspective view of a mask apparatus according to an embodiment of the present disclosure.
Figure 2:
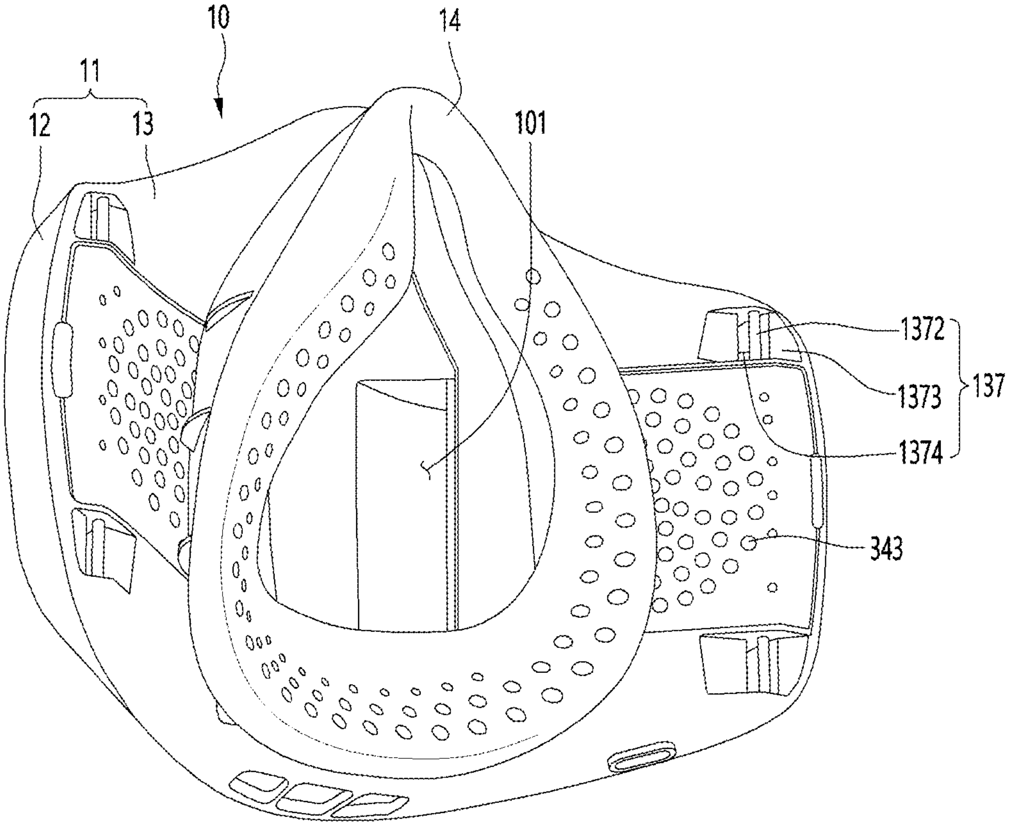
FIG. 2 is a rear perspective view of the mask apparatus.
Figure 3:
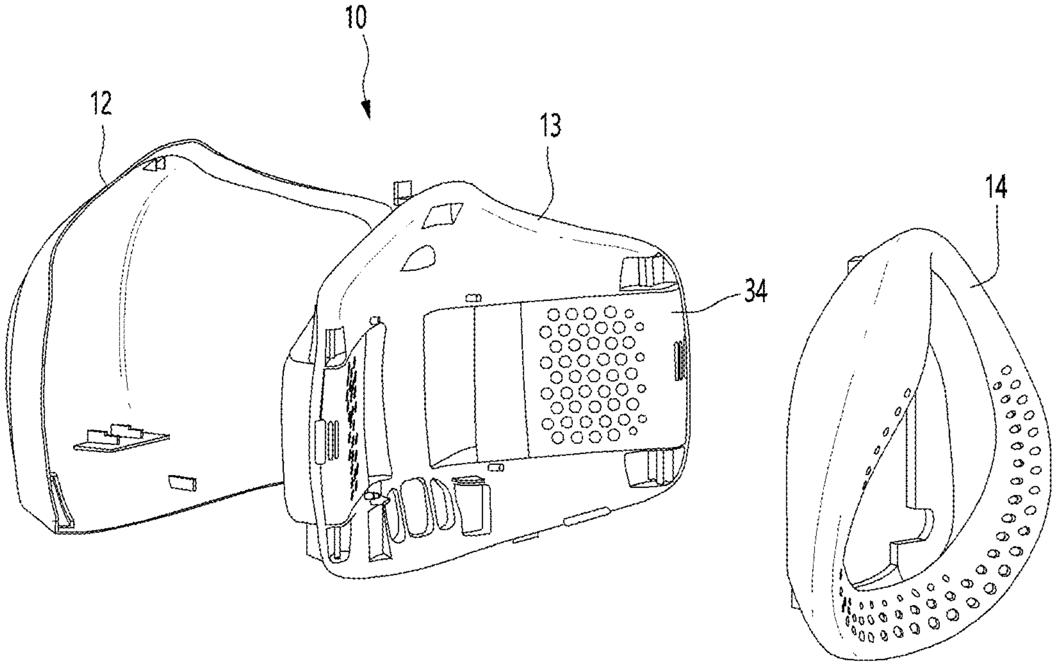
FIG. 3 is an exploded perspective view of the mask apparatus.
Figure 4:
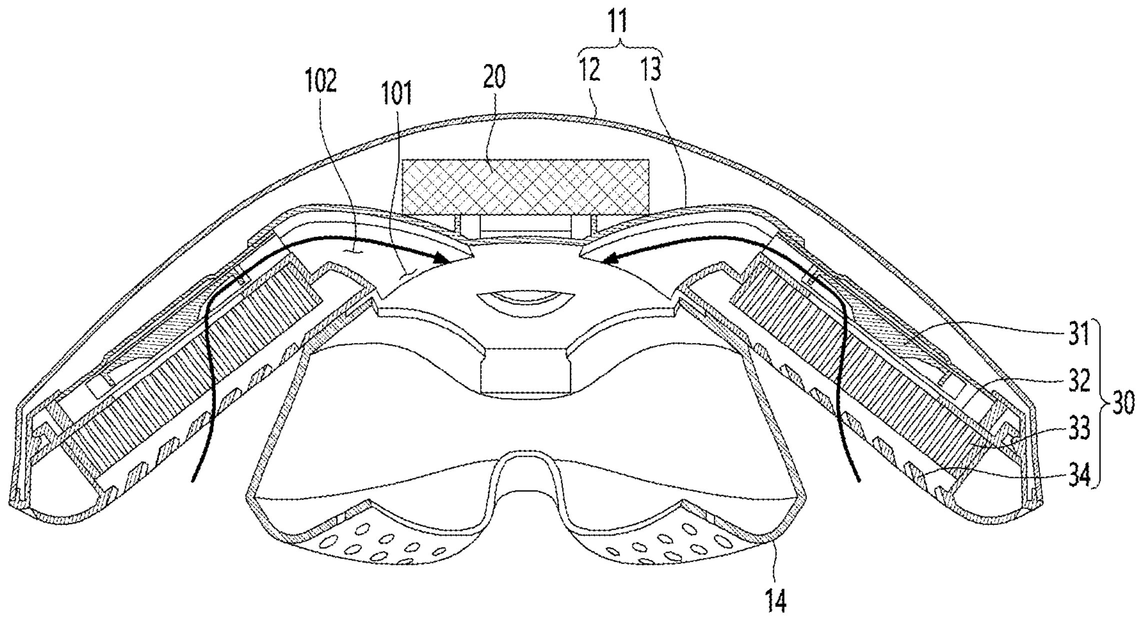
FIG. 4 is a cross-sectional view of the mask apparatus illustrating the air flow inside the mask apparatus.
Figure 5:
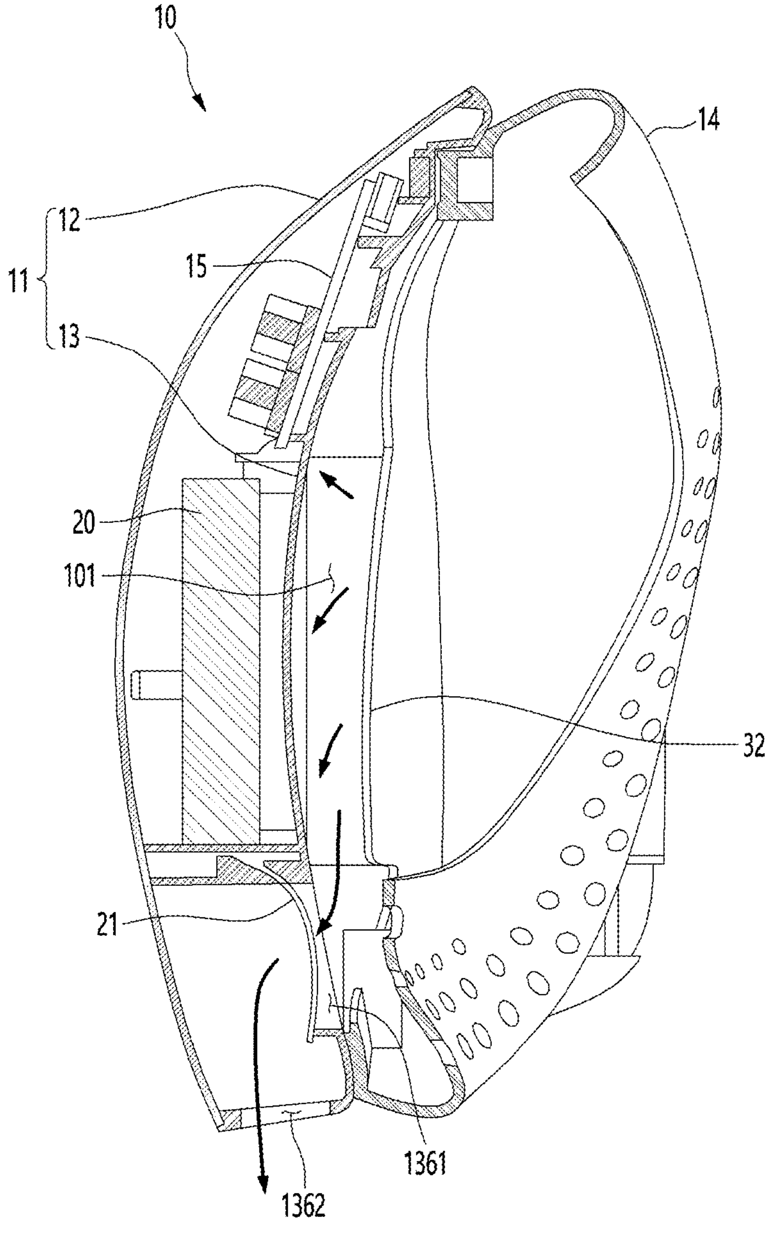
FIG. 5 is a longitudinal cross-sectional view of the mask apparatus illustrating the air flow inside the mask apparatus.

FIG. 1 is a front perspective view of a mask apparatus according to an embodiment of the present disclosure, FIG. 2 is a rear perspective view of the mask apparatus, FIG. 3 is an exploded perspective view of the mask apparatus, FIG. 4 is a cross-sectional view of the mask apparatus illustrating the air flow inside the mask apparatus, and FIG. 5 is a longitudinal cross-sectional view of the mask apparatus illustrating the air flow inside the mask apparatus.

Referring to FIGS. 1 to 5, the mask apparatus 10 according to an embodiment of the present disclosure includes a mask body 11, a face guard 14 that is fixedly or detachably coupled to the rear surface of the mask body 11, and an air cleaning module 30 mounted inside the mask body 11.

In detail, the mask body 11 includes a front body 12 forming a front external shape and a rear body 13 coupled to a rear surface of the front body 12 to form a rear external shape. The front surface of the front body 12 forms the front surface of the mask apparatus 10, and the rear surface of the rear body 13 faces the face of the user (or the wearer).

In addition, the face guard 14 is coupled to the rear surface of the rear body 13 to be in close contact with the user's face and may be formed of a silicone or rubber material having elasticity. A breathing space is formed inside the face guard 14, and when the user wears the mask apparatus 10, the user's nose and mouth are accommodated in the breathing space. Accordingly, the external air purified while passing through the air cleaning module 30 is guided to the breathing space and inhaled by the user, and air generated when the user exhales is also discharged into the breathing space.

A predetermined space is formed between the front body 12 and the rear body 13, and as illustrated in FIGS. 4 and 5, various electrical components are mounted on the front surface of the rear body 13. In addition, the various electrical components are shielded by the front body 12 and are not exposed to the outside.

In addition, the air cleaning module 30 includes a fan module 31 placed in an accommodation portion 133 (see FIG. 6) formed in the rear body 13, and a filter 33 placed behind the fan module 31. The fan module 31 includes a centrifugal fan that suctions air in an axial direction and discharges the air in a radial direction.

The air cleaning module 30 further includes a filter housing 34 disposed at the rear of the filter 33, and a suction port 343 through which external air is suctioned is formed in the filter housing 34. The filter housing 34 may be rotatably coupled to the rear body 13, and the suction port 343 may be a set of a plurality of holes having different diameters as illustrated.

In addition, a discharge port 101 is formed at a point spaced apart from the suction port 343 in the center direction of the rear body 13. External air suctioned in through the suction port or the suction grill 343 by the operation of the fan module 31 passes through the filter 33 and the fan module 31 in turn, and then is discharged into the breathing space through the discharge port 101.

The suction port, that is, the suction grill 343 is disposed outside the face guard 14, and the discharge port 101 is disposed inside the face guard 14. In other words, the suction grill 343 is located outside the breathing space, and the discharge port 101 is located inside the breathing space, so that external air suctioned in and air exhaled by the user are not mixed with each other.

Meanwhile, the air cleaning module 30 further includes a flow guide 32 disposed behind the fan module 31.

In addition, the mask apparatus 10 further includes at least one of a main control module 15, a power supply module 16, an indicator module 18, a wireless communication module 17, a speaker module 19, a battery 20, and an exhaust valve 21.

In detail, the main control module 15 is a module for controlling the operation of the fan module 31 and the speaker module 19 as well as a pressure sensor (not illustrated), a microphone (not illustrated) or the like. The main control module 15 may be disposed above the front center of the rear body 13.

The power supply module 16 is a control module for supplying power to the electric components mounted on the mask apparatus 10. The power supply module 16 may be disposed at a lower right side of the front surface of the rear body 13.

The power supply module 16 may be equipped with a terminal connector into which a terminal of a cable for power supply and data transmission is inserted, an LED module used to inform the operation state of the mask apparatus 10, and the like. Then, the light irradiated from the LED module is diffused and guided through the indicator module 18 to be emitted to the outside of the mask apparatus 10.

The wireless communication module 17 may be any one of various types of short-range wireless communication modules including Bluetooth. The wireless communication module 17 may be disposed on the lower left of the front surface of the rear body 13. The wireless communication module 17 may be mounted on the front surface of the rear body 13 in a direction crossing the rear body 13, for example, horizontally. The wireless communication module 17 may be mounted on the front surface of the rear body 13 in a horizontal state by a pair of substrate insertion ribs 1315 protruding from the front surface of the rear body 13. Both side end portions of the wireless communication module 17 are supported by the pair of substrate insertion ribs 1315.

The speaker module 19 may be disposed at the lower left of the front surface of the rear body 13 corresponding to the lower side of the wireless communication module 17.

The battery 20 may be disposed at a front center of the rear body 13, and the exhaust valve 21 may be disposed to shield an exhaust port formed below the front center of the rear body 13. In other words, the exhaust valve 21 may open the exhaust port when the user exhales, and the exhaust valve 21 may shield the exhaust port when the user breathes in. The exhaust valve 21 may be bent and provided in the form of a flat flap.

Here, it should be noted that the front, rear, left, and right sides of the mask body 11 are defined based on the state where the user wears the mask apparatus 10.

Meanwhile, as illustrated in FIGS. 4 and 5, when the user operates the fan module 31 by pressing the power button, external air is introduced into the mask apparatus 10 through the suction ports 343 formed on the left and right sides of the rear surface of the mask apparatus 10.

External air introduced through the suction port 343 is purified while passing through the filter 33. Then, the air passing through the filter 33 is suctioned in the axial direction of the fan module 31 and then discharged in the radial direction.

In addition, the air discharged in the radial direction of the fan module 31 is guided to the discharge port 101 through the air duct 102 formed by the side of the flow guide 32 and the air guide surface 1334 (see FIG. 6) of the accommodation portion 133. In addition, the air is supplied to the breathing space defined inside the face guard 14 through the discharge port 101.

Meanwhile, when the user exhales, the air discharged through the user's mouth and nose is collected in the breathing space. Then, the air collected in the breathing space descends and is discharged to the outside through the front surface exhaust port 1361 and the lower surface exhaust port 1362. Here, as the exhaust valve 21 is curved forward by the pressure of air generated when the user exhales, the front surface exhaust port 1361 is opened. In addition, when the user breathes in, the pressure inside the breathing space is lower than atmospheric pressure, and the exhaust valve 21 returns to the original position thereof to shield the front surface exhaust port 1361.

A strap connector 137 is formed at the left side end portion and the right side end portion of the rear body 13, respectively. In detail, the strap connector 137 is a portion to which an end portion of a strap or band that is caught on the user's ear or wraps around the back of the user's head is connected. The strap connector 137 may be formed at an upper portion and a lower portion of lower left ends and an upper portion and a lower portion of the right ends of the rear body 13, respectively.

Both end portions of any one of the pair of straps are respectively connected to the strap connectors 137 provided at the upper and lower ends of the left side, and both end portions of the other one can be connected to the strap connectors 137 provided at the upper and lower ends of the right side, respectively. Then, the pair of straps can be caught on both ears of the user, respectively.

As another method, both end portions of any one of the pair of straps are respectively connected to the strap connectors 137 provided at the upper end of the left side and the upper end of the right side, and both end portions of the other one are connected to the strap connectors 137 provided at the lower end of the left side and the lower end of the right end, respectively. Then, the pair of straps may be wrapped around the user's back of the head.

Each of the four strap connectors 137 includes a strap groove 1373 that is recessed from the front surface of the rear body 13 and extends in the horizontal direction (the width direction of the rear body), a strap hole 1374 formed at any point of the strap groove 1373, a strap bar 1372 connecting the upper and lower surfaces of the strap groove 1373, and a tubular waterproof sleeve 1371 (see FIG. 6) extending from the rear surface of the rear body 13 corresponding to the edge of the strap hole 1374. Then, the hook of the strap is rotatably caught to the strap bar 1372.

Figure 6:
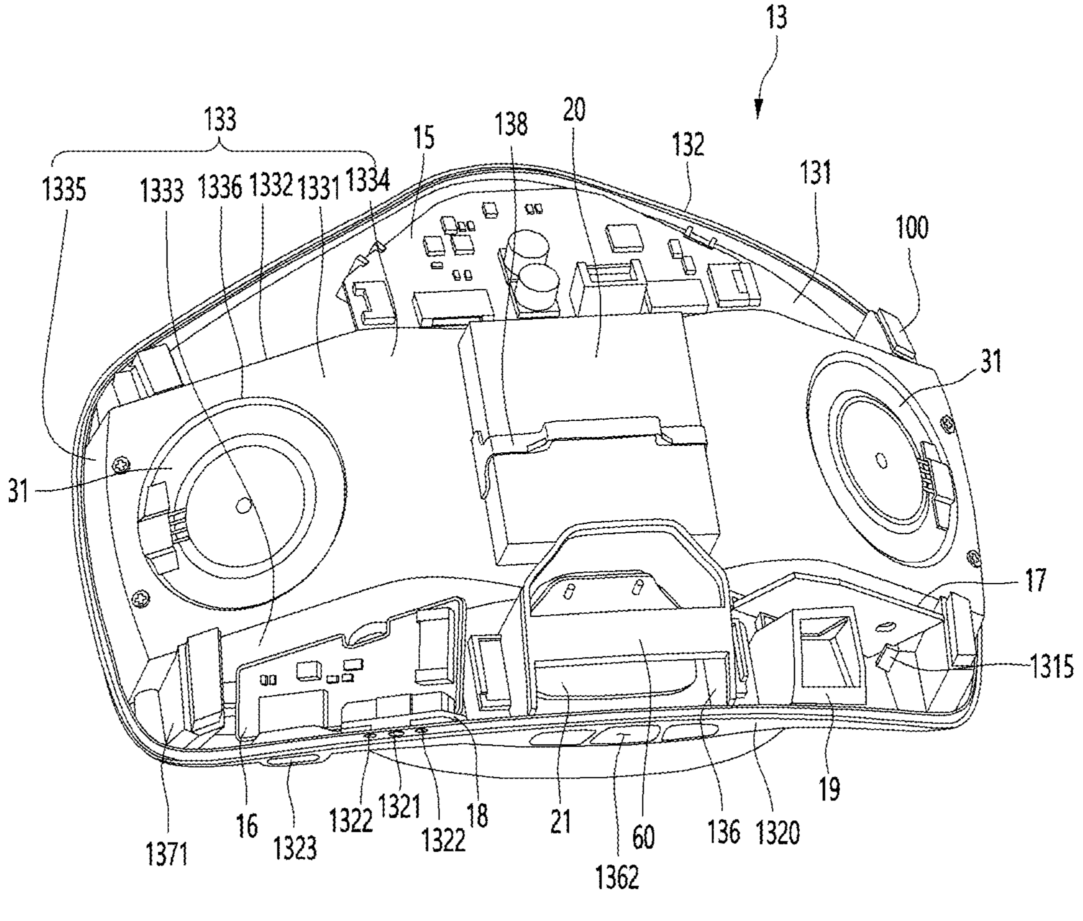
FIG. 6 is a front perspective view of a rear body constituting a mask apparatus according to an embodiment of the present disclosure.

FIG. 6 is a front perspective view of a rear body constituting a mask apparatus according to an embodiment of the present disclosure.

Referring to FIG. 6, the rear body 13 constituting the mask apparatus 10 according to the embodiment of the present disclosure includes a face cover portion 131 covering a user's face, a fusion portion 132 bent forward from an edge of the face cover portion 131, and a pair of accommodation portions 133 protruding forward from the front surface of the face cover portion 131 to accommodate the air cleaning module 30.

In detail, the fusion portion 132 is continuously formed along the top edge, both side edges, and the bottom edge of the face cover portion 131. In addition, the width of the fusion portion 132 in the front and rear direction that is bent along the lower surface edge of the face cover portion 131 and extends forward is the largest.

Among the fusion portions 132, a portion formed on the bottom edge of the face cover portion 131 may be specifically defined as an extended jaw 1320. The extended jaw 1320 has a convexly rounded shape in such a way that the width in the front and rear direction increases from both side ends toward the center of the rear body 13.

The lower surface exhaust port 1362 is formed in the center of the fusion portion 132 defined as an extended jaw, and a button hole 1321 may be formed at a point spaced apart from the lower surface exhaust port 1362 toward the side end portion of the rear body 13. A power button is inserted into the button hole 1321. A pair of indication holes 1322 having a small diameter are respectively formed at left and right edges of the button hole 1321.

The light irradiated from the light emitting means mounted on the power supply module 16 is emitted to the outside through the pair of indication holes 1322. The light emitting means includes an LED module.

When light is emitted to the outside through any one of the pair of indication holes 1322, it may mean that the power of the mask apparatus 10 is turned on. In addition, the remaining amount of the battery 20 may be predicted according to the color of light emitted through the other one of the pair of indication holes 1322.

A terminal insertion port 1323 is formed at a point further spaced apart from the button hole 1321 toward the side end portion of the rear body 13. A universal Serial Bus (USB) cable may pass through the terminal insertion port 1323 and be inserted into a terminal connector 162 (see FIG. 9) formed in the power supply module 16. The battery 20 is charged through the USB cable, and the version or function of the mask apparatus 10 may be updated or upgraded by data transmitted through the USB cable.

The pair of accommodation portions 133 are respectively formed on the left and right sides from the center of the rear body 13 and are symmetrical with respect to a vertical line passing through the center of the rear body 13.

Each of the accommodation portions 133 protrudes forward from the front surface of the face cover portion 131 to form a space for accommodating the air cleaning module 30. The accommodation portion 133 includes a seating surface 1331 on which the air cleaning module 30, specifically, the fan module 31 is seated, a fastening surface 1335 connecting the outer edge of the seating surface 1331 at a side end portion of the face cover portion 131, and an air guide surface 1334 connecting the front surface of the face cover portion 131 at the inner edge of the seating surface 1331. The air guide surface 1334 forms the front surface of the air duct 102.

In addition, the accommodation portion 133 further includes an upper surface 1332 connecting the upper ends of the seating surface 1331, the air guide surface 1334, and the fastening surface 1335 to the front surface of the face cover portion 131.

In addition, the accommodation portion 133 further includes a lower surface 1333 connecting the lower ends of the seating surface 1331, the air guide surface 1334, and the fastening surface 1335 to the front surface of the face cover portion 131.

One or more fastening means, for example, fastening hooks 1338 and 1339 (see FIG. 17) are formed on the fastening surface 1335.

A fan mounting hole 1336 is formed in the seating surface 1331, and the upper surface 1332 and the lower surface 1334 extend horizontally and may extend in parallel to each other.

The fastening surface 1335 may be convexly rounded toward the outside of the rear body 13, wherein the fastening surface may be formed to be inclined toward the seating surface 1331 from the face cover portion 131.

The air guide surface 1334 may be designed that the air suctioned by the fan module 31 is guided gently to the discharge port 101 along the air guide surface 1334 by extending convexly and roundly from the seating surface 1331 toward the face cover portion 131.

The accommodation portion 133 includes a left accommodation portion formed on the left side from the center of the rear body 13 and a right accommodation portion formed on the right side from the center of the rear body 13. The left accommodation portion and the right accommodation portion are spaced apart from the center of the rear body 13 by a predetermined distance, and the battery 20 is mounted in a space between the left accommodation portion and the right accommodation portion.

A battery mounting portion 138 may be formed on the front surface of the rear body 13. One end portion of the battery mounting portion 138 extends from either side of the left air guide surface 1334 and the right air guide surface 1334, and the other end portion thereof is connected to the other side of the left air guide surface 1334 and the right air guide surface 1334.

The battery mounting portion 138 has an n-shape and supports the front surface and both sides of the battery 20. Accordingly, a phenomenon in which the battery 20 is separated from the rear body 13 by the battery mounting portion 138 can be prevented.

In addition, the central portion of the battery mounting portion 138 further protrudes forward to be selectively capable of mounting batteries of different sizes.

Meanwhile, when the user sweats while wearing the mask apparatus 10, sweat may flow into the strap hole 1374 along the strap. In addition, even when the mask apparatus 10 is not worn, dust or other foreign substances may be introduced into the strap hole 1374.

In addition, moisture introducing through the strap hole 1374 may corrode the electrical components mounted on the front surface of the rear body 13, and there is a risk of causing sparks around the electrical components due to the introducing dust.

In order to improve this problem, a waterproof sleeve 1371 is formed on the front surface of the rear body 13. The waterproof sleeve 1371 extends by a predetermined length forward from the front surface of the rear body 13 along the edge of the strap hole 1374.

In addition, a sealing cap 100 is inserted into the waterproof sleeve 1371, so that the introduction of moisture and foreign substances introduced through the strap hole 1374 into the space between the front body 12 and the rear body 13 can be blocked. The structure of the waterproof sleeve 1371 and the sealing cap 100 will be described in detail below with reference to the drawings.

Meanwhile, the exhaust flow path guide 136 protrudes forward from the front surface of the face cover portion 131 corresponding to the lower side of the battery mounting portion 138. In addition, a sealing cover 60 is mounted on the front end portion of the exhaust flow path guide 136, and the sealing cover 60 will be described in detail below with reference to the drawings.

In detail, the exhaust flow path guide 136 is formed below the battery mounting portion 138, and the lower end portion of the battery 20 mounted on the battery mounting portion 138 is supported by the upper surface of the exhaust flow path guide 136. As a result, it is possible to prevent the battery 20 from being pulled downward due to gravity while being inserted into the battery mounting portion 138.

The exhaust flow path guide 136 may form a substantially tunnel-shaped longitudinal cross-section, and a front surface exhaust port 1361 may be formed in the face cover portion 131 corresponding to the inner side of the exhaust flow path guide 136.

At least one of the front surface exhaust port 1361 and the lower surface exhaust port 1362 may be formed in the form of an exhaust grill divided into a plurality of small exhaust ports by a plurality of grills or partition ribs. In addition, the front surface exhaust port 1361 is selectively opened and closed by the exhaust valve 21.

Figure 7:
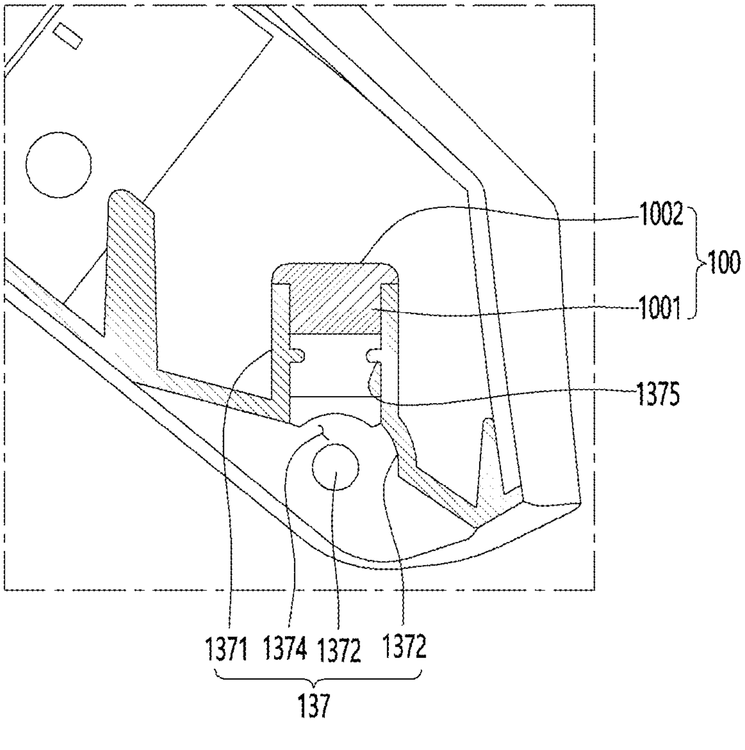
FIG. 7 is an enlarged cross-sectional view illustrating a waterproof sleeve structure to which the sealing cap of the mask apparatus according to the embodiment of the present disclosure is mounted.

FIG. 7 is an enlarged cross-sectional view illustrating a waterproof sleeve structure to which the sealing cap of the mask apparatus according to the embodiment of the present disclosure is mounted.

Referring to FIG. 7, the waterproof sleeve 1371 extends to a length spaced apart 10) from the rear surface of the front body 12.

In detail, the introduction of moisture and foreign substances to a space between the front body 12 and the rear body 13 can be blocked by allowing the waterproof sleeve 1371 to extend to a length in contact with the rear surface of the front body 12. However, in a state where the rear body 13 and the front body 12 are coupled, there is a high possibility that the end portion of the waterproof sleeve 1371 is not completely in close contact with the rear surface of the front body 12 due to assembly tolerance.

Alternatively, the end portion of the waterproof sleeve 1371 may be thermally fused to the rear surface of the front body 12, but there is a risk that the waterproof sleeve 1371 may melt or the shape of the front body 12 may change during the thermal-fusion process. Furthermore, a portion to which the end portion of the waterproof sleeve 1371 is thermally fused is exposed on the front surface of the mask apparatus 10, which may cause an aesthetic problem.

In order to solve this problem, the sealing cap 100 having the same cross-sectional structure as the cross-sectional shape of the waterproof sleeve 1371 and having a shorter length than the waterproof sleeve 1371 may be inserted into the waterproof sleeve 1371.

The sealing cap 100 may be made of an elastically deformable material, for example, a silicone material or a rubber material. The sealing cap 100 includes a cap body 1001 inserted into the waterproof sleeve 1371, and a cap cover 1002 formed on an upper end of the cap body 1001. The width of the cap cover 1002 is formed to be larger than the width of the cap body 1001, so that the cap cover 1002 is caught on the end portion of the waterproof sleeve 1371, so that the inserted limit of the sealing cap 100 can be determined.

Alternatively, the sealing cap 100 may have the same shape as the inner shape of the waterproof sleeve 1371, and a stopper protrusion 1375 may protrude from the inner circumferential surface of the waterproof sleeve 1371. The insertion limit of the sealing cap 100 may be determined by the stopper protrusion 1375.

In addition, when the cross-sectional size of the sealing cap 100 is manufactured to be slightly larger than the cross-sectional size of the waterproof sleeve 1371 and the sealing cap is pushed into the waterproof sleeve 1371, the surface of the sealing cap 100 and the inner circumferential surface of the waterproof sleeve 1371 are strongly in close contact with each other, thereby maximizing the sealing effect.

As a further alternative method, the waterproof sleeve 1371 may extend forward from the edge of the strap hole 1374 and extend obliquely to increase the cross-sectional area. Then, when the sealing cap 100 is inserted into the waterproof sleeve 1371, as the insertion depth of the sealing cap 100 increases, while the amount of compression of the sealing cap 100 increases, the insertion limit of the sealing cap 100 can be determined.

Figure 8:
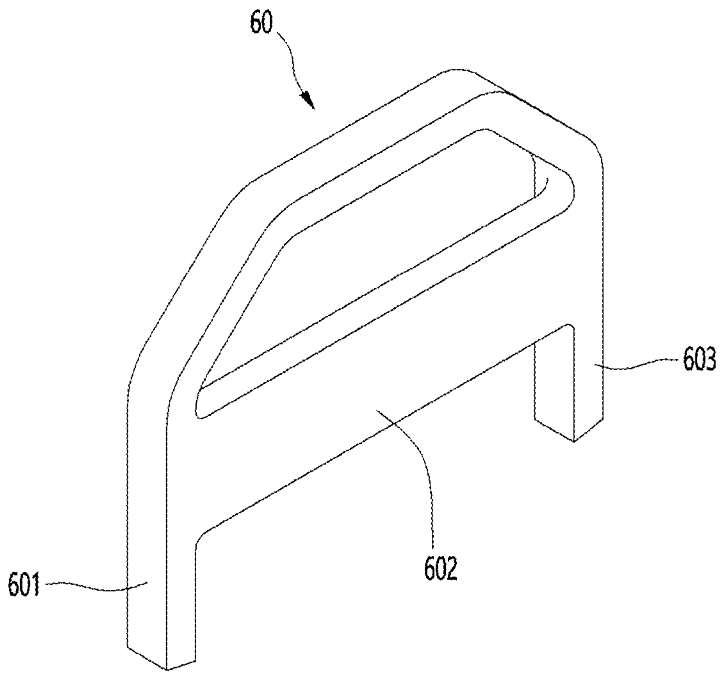
FIG. 8 is a front perspective view of the sealing cover inserted into the front end portion of the flow guide.
Figure 9:
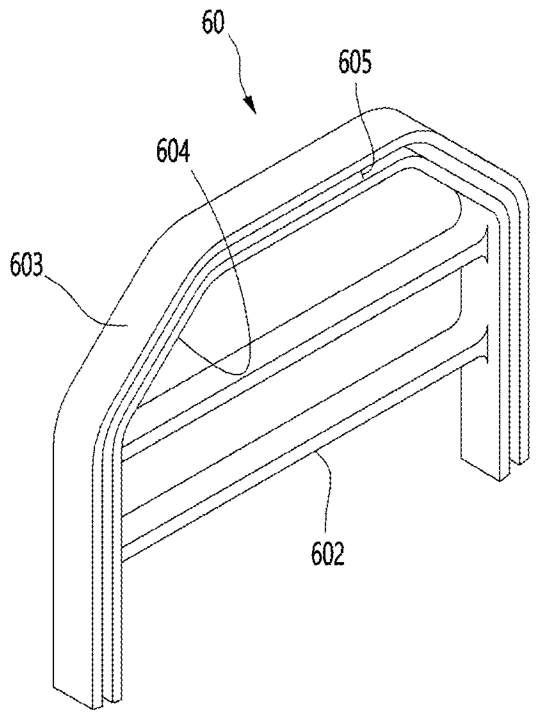
FIG. 9 is a rear perspective view of the sealing cover.

FIG. 8 is a front perspective view of the sealing cover inserted into the front end portion of the flow guide, and FIG. 9 is a rear perspective view of the sealing cover.

Referring to FIGS. 8 and 9, when the front body 12 is coupled to the rear body 13, the front end portion of the exhaust flow path guide 136 is designed to be in close contact with the rear surface of the front body 12.

However, the front end portion of the exhaust flow path guide 136 may be spaced apart from the rear surface of the front body 12 to generate a gap due to assembly tolerance, the tolerance due to contraction after injection, or the like. In addition, in the process of moving or performing rough exercise while wearing the mask apparatus 10 in rain, a phenomenon that moisture or saliva introduces into a space between the front body 12 and the rear body 13 through the gap may occur.

In order to prevent this phenomenon, like the waterproof sleeve 1371, the front end portion of the exhaust flow path guide 136 may be thermally fused to the rear surface of the front body 12. Then, the same problem as the problem that occurs when the waterproof sleeve 1371 is thermally fused may occur.

In order to solve such a problem, a sealing cover 60 may be mounted on the front end portion of the exhaust flow path guide 136.

In detail, the sealing cover 60, like the sealing cap 100, may be made of an elastic material such as silicone or rubber.

The sealing cover 60 includes an approximately n-shaped cover frame 601 extending along the front end portion of the exhaust flow path guide 136, an inner rib 604 extending rearward from the inner edge of the cover frame 601, an outer rib 603 extending rearward from the outer edge of the cover frame 601, and a connection rib 602 connecting the left and right portions of the cover frame 601.

A fitting groove 605 having a width of a size corresponding to the thickness of the exhaust flow path guide 136 is formed between the inner rib 604 and the outer rib 603, and the front end portion of the exhaust flow path guide 136 is inserted in the fitting groove 605.

In addition, since the connection rib 602 is formed, it is possible to prevent a phenomenon that both end portions of the cover frame 601 are widened.

In addition, both lower end portions of the sealing cover 60 are formed with a length in contact with the extension jaws 1320 formed on the lower edge of the face cover portion 131. Then, when the front body 12 is coupled to the rear body 13, a gap is not generated between the lower end portion of the sealing cover 60 and the extension jaw 1320.

Figure 10:
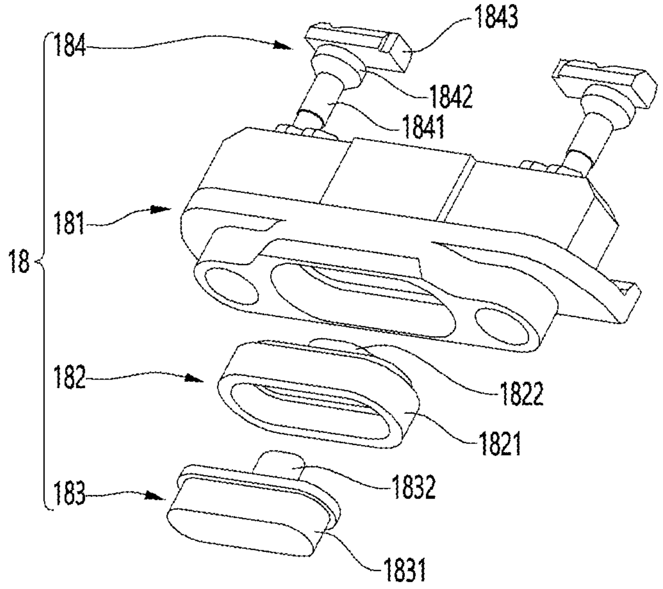
FIG. 10 is an exploded perspective view illustrating a coupling relationship between a power module and an indicator module of a mask apparatus according to an embodiment of the present disclosure.

FIG. 10 is an exploded perspective view illustrating a coupling relationship between a power module and an indicator module of a mask apparatus according to an embodiment of the present disclosure.

Referring to FIG. 10, the power supply module 16 mounted on the mask apparatus 10 is disposed on the lower right of the front surface of the rear body 13, and the indicator module 18 is assembled and coupled to the substrate of the power supply module 16.

In detail, the power supply module 16 includes a power substrate 161 and a plurality of electrical components mounted on the front surface of the power substrate 161. The plurality of electrical components includes at least one of a terminal connector 162, a connector 163, a power switch 164, and LEDs 165 and 166.

The terminal connector 162 performs the interface function for charging the battery 200 by inserting the USB cable from the outside or updating or upgrading the version or function of the mask apparatus 10 by the data transmitted through the USB cable.

The connector 163 performs the function for providing power to the main control module 15 by connecting the PCB of the main control module 15.

The power switch 164 is turned on or off by the power button 183 mounted on the button hole 1321. The power switch 164 may be mounted on the lower end of the left side of the power substrate 161.

When the power switch 164 is turned on by the operation of the power button 183, power is supplied to the electric components mounted on the mask apparatus 10, and when the power switch 164 is turned off by the operation of the power button 183, the power supply to the electric components mounted on the mask apparatus 10 is cut off.

The LEDs 165 and 166 emit light to the outside to inform the operation state of the mask apparatus 10. The light irradiated from the LEDs 165 and 166 is diffused and guided through the indicator module 18 to be emitted to the outside of the mask apparatus 10. When the indicator module 18 is coupled to the power substrate 161, the LEDs 165 and 166 are shielded by the indicator module 18 or accommodated in the indicator module 18.

The LEDs 165 and 166 are disposed to be spaced apart from each other on the both sides with respect to the power switch 164 in the left and right direction. The LEDs 165 and 166 include a first LED 165 spaced apart from the right side of the power switch 164 and a second LED 166 spaced apart from the left side of the power switch 164.

In addition, mounting holes 167 and 168 for mounting the indicator module 18 are formed in the power substrate 161. The mounting holes 167 and 168 are portions to which a portion of the indicator module 18 is caught and coupled to each other in a hook manner.

The mounting holes 167 and 168 are respectively spaced apart from each other on both sides with respect to the power switch 164 in the left and right direction. The mounting holes 167 and 168 include a first mounting hole 167 spaced apart from the right side of the power switch 164 and a second mounting hole 168 spaced apart from the left side of the power switch 164. The first mounting hole 167 is spaced apart from the upper side of the first LED 165, and the second mounting hole 168 is spaced apart from the upper side of the second LED 166.

The indicator module 18 is mounted on the power substrate 161 and functions to focus the light of the LEDs 165 and 166 to diffuse and guide the light to the outside of the mask apparatus 10.

The indicator module 18 includes an indicator body 181, a button sealing portion 182 inserted inside the bottom surface of the indicator body 181, a power button 183 inserted into the button sealing portion 182, and a light guide portion 184 inserted into the indicator body 181.

The button sealing portion 182 includes a sealing portion body 1821 forming an insertion space into which the power button 183 is inserted. The sealing portion body 1821 is mounted with a button mounting groove 1813 (see FIG. 11) formed on the bottom surface of the button mounting portion 1812 in a state where the power button 183 is inserted therein. The sealing portion body 1821 may be disposed to surround the inside of the button mounting groove 1813. The sealing portion body 1821 may be formed of a rubber or silicone material.

The insertion space of the sealing portion body 1821 may be formed by being recessed upwardly from the bottom surface of the sealing portion body 1821. When the button sealing portion 182 is inserted into the button mounting groove 1813, the bottom surface of the sealing portion body 1821 may smoothly form a single surface without a step difference with the bottom surface of the button mounting portion 1812.

The sealing portion body 1821 performs a function of preventing moisture or foreign substances introduced into the space between the power button 183 and the button hole 1321 of the rear body 13 from introducing into the power substrate 161 side. To this end, the sealing portion body 1821 may be disposed to face the button hole 1321 and may have a cross-sectional area greater than that of the button hole 1321. Accordingly, a plurality of electrical components mounted on the power substrate 161 may be waterproofed and protected from the outside.

In addition, a through-boss 1822 through which a portion of the power button 183 passes is formed on the upper surface of the sealing portion body 1821. The through-boss 1822 may have an opening through which the power button 183 passes and may protrude upward from the center of the upper surface of the sealing portion body 1821.

The through-boss 1822 is disposed to face the power switch 164. Accordingly, when the power button 183 is pressed, a portion of the power button 183 may pass through the through-boss 1822 to be in contact with the power switch 164. The power switch 164 includes a tact switch.

The power button 183 may be understood as a configuration that operates the power switch 164 by being pressed by a user. The power button 183 may be exposed to the outside of the mask apparatus 10 through the button hole 1321 while being inserted into the button sealing portion 182.

According to one embodiment, the power button 183 may be elastically installed to be movable by a predetermined distance in the vertical direction between the button sealing portion 182 and the rear body 13. To this end, an elastic member may be interposed between the power button 183 and the button sealing portion 182. The elastic member may include a spring.

The power button 183 may include a button body 1831 mounted on the button sealing portion 182 and pressed by the user, and a button protrusion 1832 protruding from the upper surface of the button body 1831 to be in contact with the power switch 164.

The button protrusion 1832 may protrude upward from the center of the upper surface of the button body 1831. The button protrusion 1832 may be disposed to face the through-boss 1822. Accordingly, when the button body 1831 is pressed by an external force, the button protrusion 1832 passes through the through-boss 1822 to press the power switch 164.

The light guide portion 184 is accommodated in the indicator body 181, and serves to guide the light emitted from the LEDs 165 and 166 toward the indication hole 1322 without spreading. A pair of the light guide portions 184 are formed and are respectively accommodated inside the pair of reflectors 1815. The light guide portion 184 may be mounted on the upper surface of the base 1811, and a portion of the light guide portion 184 may be inserted into the light guide portion hole 1814.

In detail, the light guide portion 184 may include a tube portion 1841 formed in a tubular shape and inserted into the indication hole 1322, an extension tube 1842 expanding and extending from the upper end of the tube portion 1841, and a fixing portion 1843 formed on the upper end of the extension tube 1842 and fixed to the upper surface of the base 1811.

A center of the tube portion 1841 may coincide with a center of the indication hole 1322. The extension tube 1842 may have an outer diameter of an area corresponding to an inner diameter of the light guide portion hole 1814 and may be inserted into the upper end of the light guide portion hole 1814. The fixing portion 1843 may be disposed to face the LEDs 165 and 166 while being fixed to the upper surface of the base 1811. In this case, an opening communicating with the extension tube 1842 is formed in the fixing portion 1843.

Accordingly, the light generated by the LEDs 165 and 166 is focused by the reflector 1815 and guided into the light guide portion 184. In addition, the light passing through the light guide portion 184 is diffused and emitted to the outside of the mask apparatus 10 through the indication hole 1322.

Figure 11:
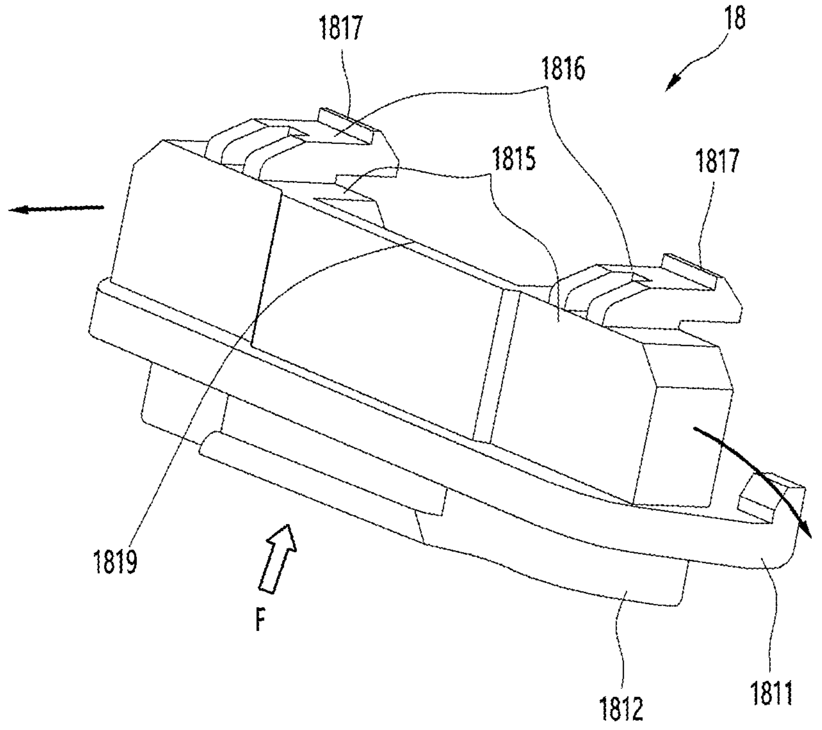
FIG. 11 is a front perspective view of an indicator body constituting an indicator module according to an embodiment of the present disclosure.
Figure 12:
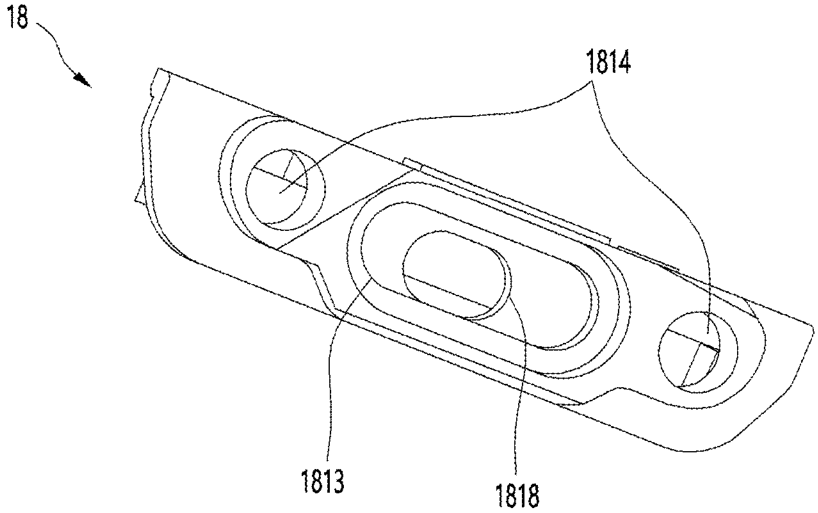
FIG. 12 is a bottom view of the indicator body.
Figure 13:
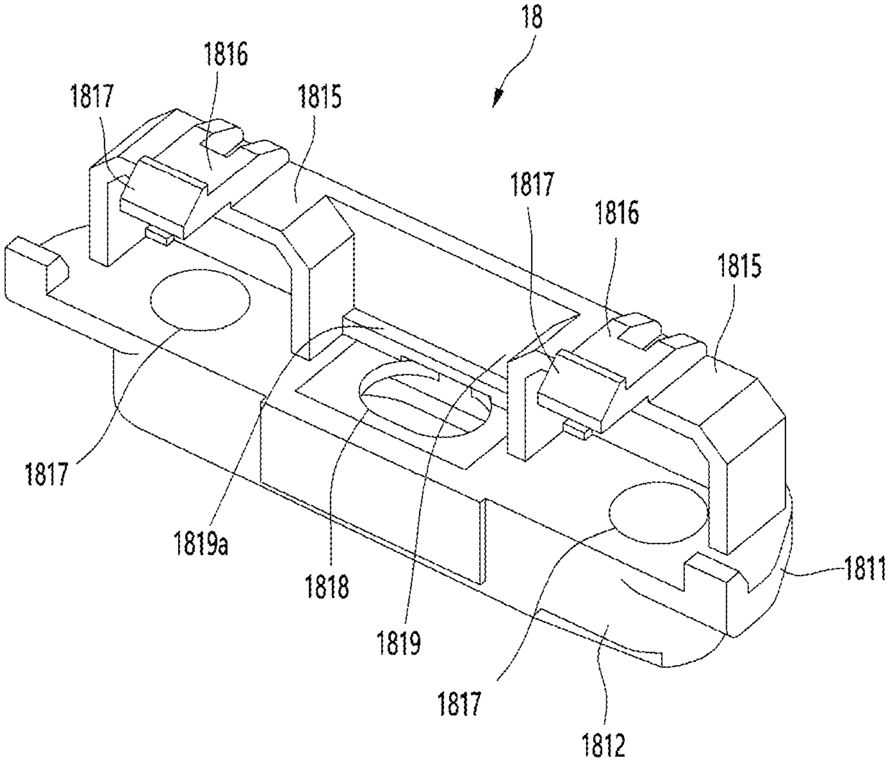
FIG. 13 is a rear perspective view of the indicator body.

FIG. 11 is a front perspective view of an indicator body constituting an indicator module according to an embodiment of the present disclosure, FIG. 12 is a bottom view of the indicator body, and FIG. 13 is a rear perspective view of the indicator body.

Referring to FIGS. 11 to 13, the indicator body 181 constituting the indicator module 18 according to the embodiment of the present disclosure includes a base 1811, a button mounting portion 1812 extending downward from the bottom surface of the base 1811, a pair of reflectors 1815 extending upward from both sides of the upper surface of the base 1811, and curving prevention wall 1819 connecting the pair of reflectors 1815. In addition, the indicator body 181 may further include catching portions 1816 and 1817 respectively formed on upper surfaces of the pair of reflectors 1815.

The base 1811 is formed in a shape extending to be elongated in the left and right direction. A center of the base 1811 may be aligned with a center of the power switch 164. A button through-hole 1818 through which the power button 183 passes is formed in the center of the upper surface of the base 1811. When the power button 183 is pressed, the power button 183 passes through the button through-hole 1818 to press the power switch 164.

The button mounting portion 1812 is formed to be elongated in the left and right direction from the bottom surface of the base 1811. In this case, the center of the button mounting portion 1812 may be aligned with the center of the base 1811. A button mounting groove 1813 into which the power button 183 is inserted is formed in the center of the button mounting portion 1812. The button mounting groove 1813 may be formed by being recessed upwardly from the bottom surface of the button mounting portion 1812. The button mounting groove 1813 is connected to the button through-hole 1818.

In addition, a light guide portion hole 1814 into which the light guide portion 184 is inserted is formed on a bottom surface of the button mounting portion 1812. The light guide portion hole 1814 may be formed to penetrate upwardly from the bottom surface of the button mounting portion 1812. In this case, the light guide portion hole 1814 may penetrate from the bottom surface of the button mounting portion 1812 to the upper surface of the base 1811.

The light guide portion hole 1814 is formed to be spaced apart from each other on both sides of the button mounting groove 1813. The pair of light guide portion hole 1814 may be connected to the pair of indication holes 1322 to face each other.

The reflector 1815 forms an accommodation space for accommodating the LEDs 165 and 166 and functions to focus the light emitted from the LEDs 165 and 166. The reflectors 1815 are formed to be spaced apart from each other on both sides of the upper surface of the base 1811 with respect to the button through-holes 1818.

The reflector 1815 may have a shape extending upward from both sides of the upper surface of the base 1811, and having a front surface, both sides, and an upper surface closed and a rear surface open. In addition, when the indicator module 18 is coupled to the power substrate 161, the LEDs 165 and 166 mounted on the power substrate 161 are accommodated in the internal space of the reflector 1815. The accommodation space of the reflector 1815 is connected to the light guide portion hole 1814.

The catching portions 1816 and 1817 are portions formed in the reflector 1815 and coupled to the mounting holes 167 and 168. The catching portions 1816 and 1817 include an extension portion 1816 extending from the upper surface of the reflector 1815 and a hook portion 1817 formed at an end portion of the extension portion 1816.

The extension portion 1816 may extend rearward from the upper surface of the reflector 1815, and the hook portion 1817 may be provided at an end portion thereof. The pair of hook portions 1817 are respectively hooked to the pair of mounting holes 167 and 168, so that the indicator module 18 can be stably fixed to the power substrate 161 without shaking.

When the user presses the power button 183 toward the power switch 164 in a state where the indicator module 18 is assembled to the mask apparatus, the center of the base 1811 may be curved upward and convexly to be rounded by the force of pressing the power button 183. In addition, as the base 1811 is curved, the pair of reflectors 1815 are spread apart or curved in a direction away from each other. Due to this phenomenon, excessive force is transmitted to the power switch 164 to cause damage of the power switch.

In order to solve this problem, the pair of reflectors 1815 are connected by the curving prevention wall 1819. The curving prevention wall 1819 connects inner edges of the front surfaces of the pair of reflectors 1815. In addition, a stepped portion 1819*a* may be formed at a point where the lower end of the curving prevention wall 1819 and the upper surface of the base 1811 meet.

Due to the curving prevention wall 1819 and the stepped portion 1819*a*, even when an excessive force is applied to the power button 183, the curving phenomenon of the base 1811 does not occur, so that the mounted components on the power substrate 161 may be prevented from being damaged or from disturbing the alignment between the light guide portion 184 and the indication hole.

Figure 14:
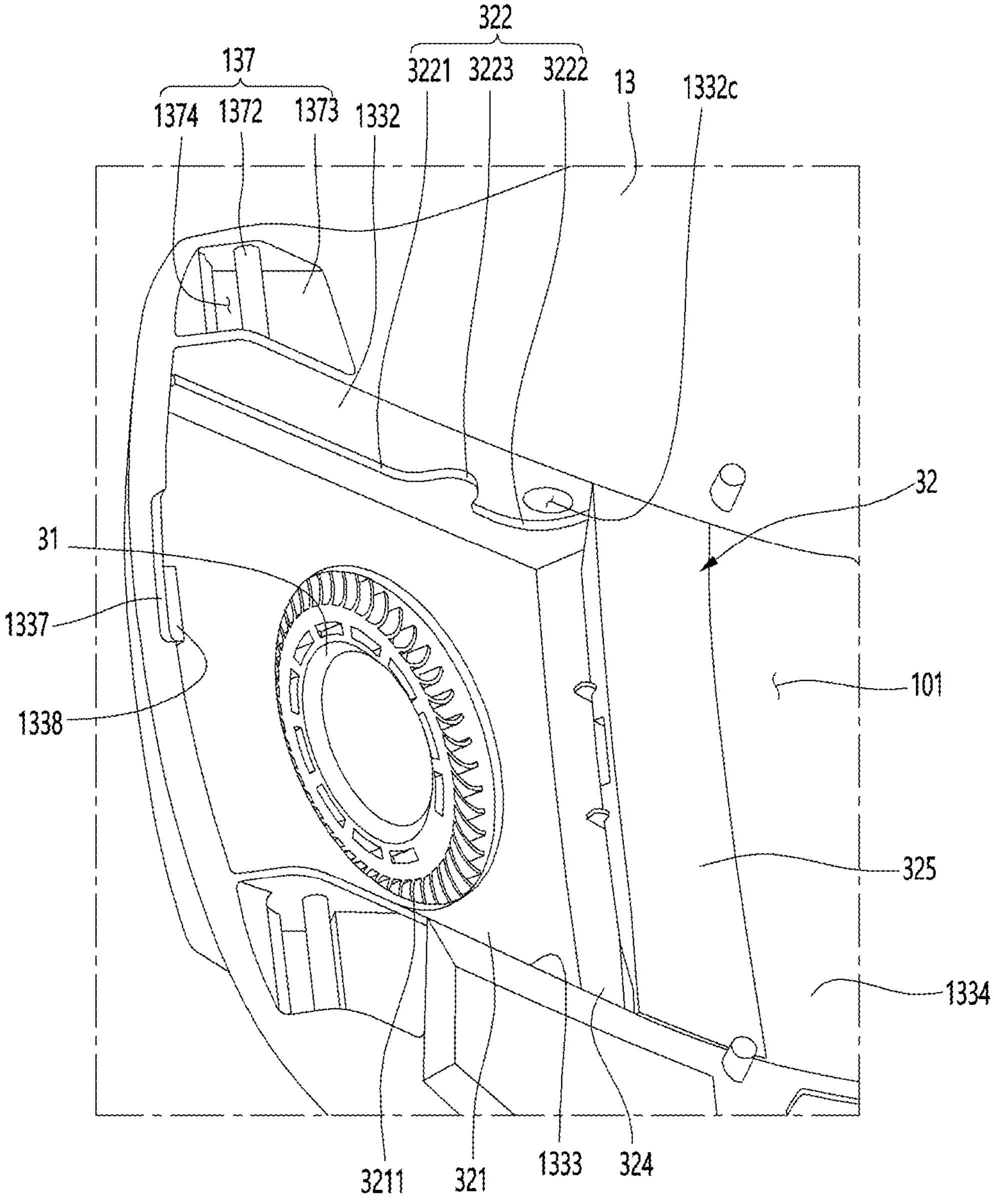
FIG. 14 is an enlarged perspective view illustrating the rear surface of the rear body in a state where the filter housing and the filter are removed.
Figure 15:
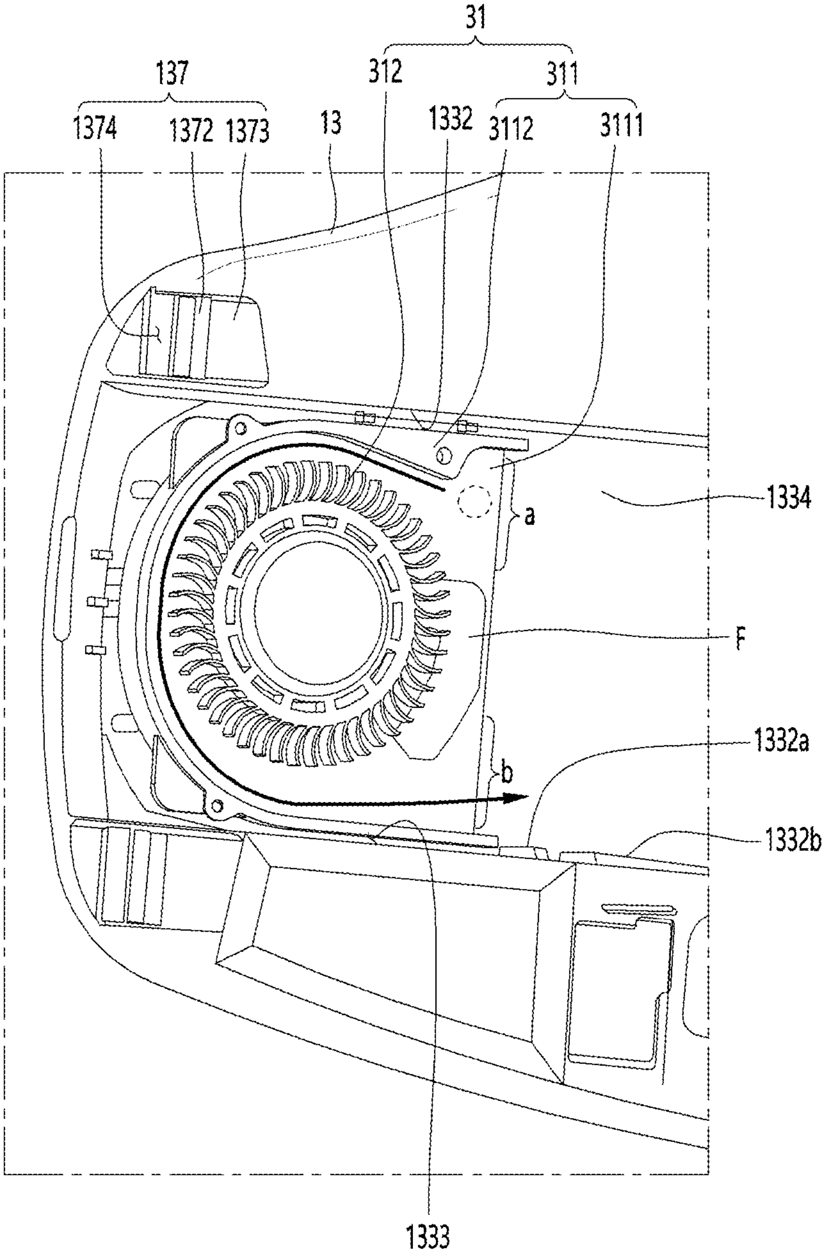
FIG. 15 is an enlarged perspective view illustrating the rear surface of the rear body in a state where the flow guide is removed.
Figure 16:
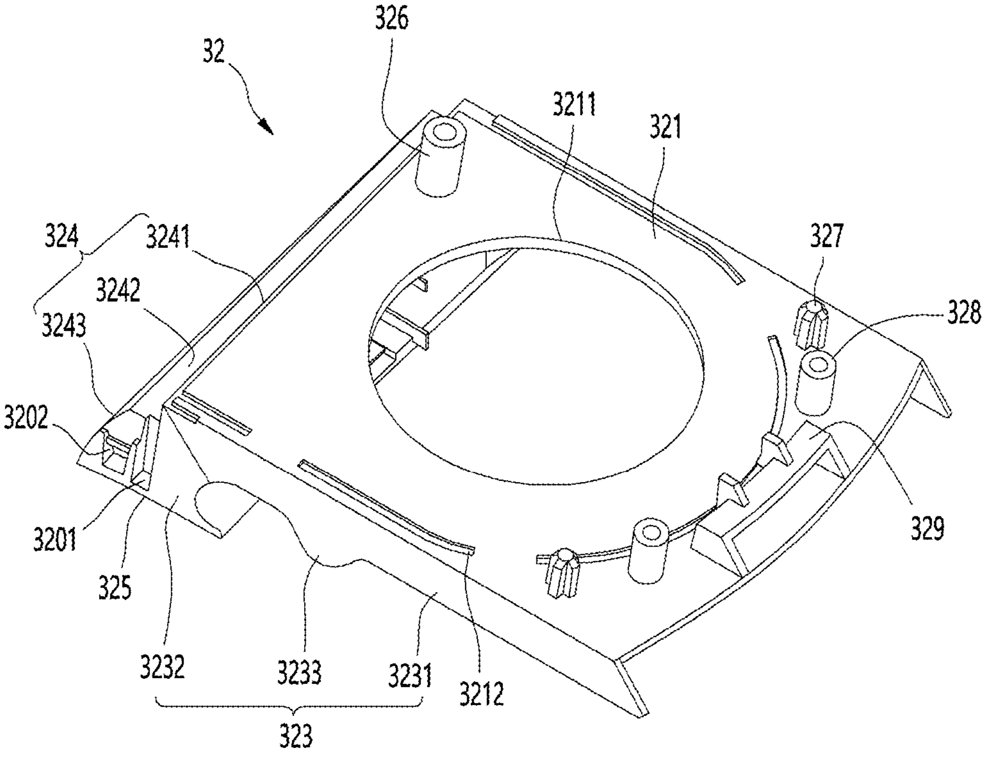
FIG. 16 is a front perspective view of the flow guide.

FIG. 14 is an enlarged perspective view illustrating the rear surface of the rear body in a state where the filter housing and the filter are removed, FIG. 15 is an enlarged perspective view illustrating the rear surface of the rear body in a state where the flow guide is removed, and FIG. 16 is a front perspective view of the flow guide.

Referring to FIGS. 14 to 16, as described above, the accommodation portion 133 in which the air cleaning module 30 is accommodated includes a seating surface 1331 on which the air cleaning module 30, specifically, the fan module 31 is seated, a fastening surface 1335 connecting the outer edge of the seating surface 1331 at the side end portion of the face cover portion 131, and an air guide surface 1334 connecting the front surface of the cover portion 131 at the inner edge of the seating surface 1331. The air guide surface 1334 forms the front surface of the air duct 102.

A flow guide hook 1339 (see FIG. 18) and a filter hook 1338 are formed on the fastening surface 1335 to be spaced apart from each other in the front and rear direction, respectively. The flow guide hook 1339 is located closer to the seating surface 1331 than the filter hook 1338.

In addition, a gripping groove 1337 is formed at the side end of the rear surface of the rear body 13 corresponding to the rear of the filter hook 1338.

In addition, the accommodation portion 133 further includes an upper surface 1332 connecting the upper ends of the seating surface 1331, the air guide surface 1334, and the fastening surface 1335 and the front surface of the face cover portion 131.

In addition, the accommodation portion 133 further includes a lower surface 1333 connecting the lower ends of the seating surface 1331, the air guide surface 1334, and the fastening surface 1335 and the front surface of the face cover portion 131.

In detail, a mounting guide 1332*a*, a fixing guide 1332*b*, and a hinge hole 1332*c* are formed on the upper surface 1332 and the lower surface 1333 of the accommodation portion 133, respectively.

The mounting guide 1332*a* is provided in the form of a rib extending by a predetermined length in a direction from the rear surface to the front surface of the mask body 11. The fixing guide 1332*b* is provided in the form of a protrusion protruding at a portion spaced apart from the mounting guide 1332*a* in the center direction of the mask body 11.

In addition, the hinge hole 1332*c* is provided in the form of a long hole at a point spaced apart from the mounting guide 1332*a* toward the side end portion of the mask body 11. The hinge hole 1332*c* is a hole into which the hinge 346 (see FIG. 17) of the filter housing 34 is inserted and may have a non-circular shape, for example, an elliptical long hole.

In addition, the hinge hole 1332*c* may extend obliquely in a direction closer to the rear surface of the mask body 11 toward the side end portion of the mask body 11. In other words, when the elliptical hinge hole 1332*c* is designed, the distance from one end portion of the hinge hole 1332*c* close to the center of the mask body 11 to the rear surface of the mask body 11 may be designed to be longer than the distance from the other end portion of the hinge hole 1332*c* close to the side end portion of the mask body 11 to the rear surface of the mask body 11.

The reason why the hinge hole 1332*c* extends obliquely in the form of a long hole is that when the end portion of the filter housing 34 is rotated to separate the filter 33, the filter housing 34 is to prevent from being interfered with the rear flange 325 of the flow guide 32.

In detail, in a state where the fastening hook 344 of the filter housing 34 (see FIG. 17) is separated from the filter hook 1338 protruding from the fastening surface 1335, when the filter housing 34 is rotated, the filter housing 34 is rotated while being pulled toward the side end portion of the mask body 11. Then, the hinge 346 of the filter housing 34 rotates while moving from one end portion of the long-hole-shaped hinge hole 1332*c* toward the other end portion thereof and is in a state as illustrated in FIG. 18.

According to the structure of the hinge hole 1332*c* of the present disclosure, there is an advantage in that the filter housing 34 does not interfere with the rear flange 325, and the rotation amount (or opening angle) of the filter housing 34 becomes larger compared to the case where the hinge hole 1332*c* is circular. As a result, there is an advantage in that the mounting and separation of the filter 33 can be made much more easily.

Meanwhile, the fan module 31 includes a fan housing 311 and a fan 312. In addition, the fan housing 311 includes a base 3111 seated on the seating surface 1331 of the accommodation portion 133 and a shroud 3112 protruding from the edge of the base 3111 by a predetermined height. The shroud 3112 is surrounded along an edge of the base 3111, and a middle portion thereof extends to be rounded along the outer periphery of the fan 312.

A PCB F for driving the fan motor is disposed on the base. The PCB includes a flexible PCB that can be curved.

The shroud 3112 extends from one edge of one end portion of the base 3111 in a straight line, and at a certain point along the outer periphery of the fan 313, extends to be rounded with a predetermined curvature, and then extends in a straight line to the other edge of one end portion of the base 3111.

A guide protrusion 3113 protrudes from the inner surface of one end portion of the shroud 3112, and air rotates from the space between the guide protrusion 3113 and the fan 312 in the rotation direction of the fan and is discharged toward the side end portion of the shroud 3112 facing the guide protrusion 3113.

The portion where the guide protrusion 3113 is formed, that is, the portion where the rotation of the air starts can be defined as the inlet a, and the portion through which the air rotating along the shape of the shroud 3112 exits can be defined as the outlet b.

The air exiting through the outlet b is supplied to the user's face through the discharge port 101.

Meanwhile, in a state where the fan module 31 is mounted on the accommodation portion 133, the flow guide 32 is placed on the rear surface of the fan module 31. In other words, the flow guide 32 is placed at the rear end of the shroud 3112.

The flow guide 32 includes a mount plate 321 covering the open rear surface of the fan housing 311, a duct flange 324 bent and extended from one end of the mount plate 321, upper flanges 322 bent and extended from the upper ends of the mount plate 321 and the duct flange 324, lower flanges 323 bent and extended from the lower ends of the mount plate 321 and the duct flange 324, and a rear flange 325 extending in a direction crossing the duct flange 324 at an end portion of the duct flange 324.

The other end of the mount plate 321 is in close contact with the fastening surface 1335 of the accommodation portion 133. In addition, a communication hole 3211 is formed in the mount plate 321, and the communication hole 3211 functions as a suction port of the fan module 31.

The upper flange 322 includes a mount upper flange 3221, a duct upper flange 3222, and a guide shoulder 3223.

The mount upper flange 3221 is vertically bent at the upper end of the mount plate 321 and extends to have a predetermined width. The duct upper flange 3222 is vertically bent from the upper end of the duct flange 324 and extends to have a predetermined width. The mount upper flange 3221 and the duct upper flange 3222 are formed as one body to form an L-shape.

The lower flange 323 includes a mount lower flange 3231, a duct lower flange 3232, and a guide shoulder 3233.

The mount lower flange 3231 is vertically bent at the lower end of the mount plate 321 and extends to have a predetermined width. The duct lower flange 3232 is vertically bent at the lower end of the duct flange 324 and extends to have a predetermined width.

The upper flange 322 and the lower flange 323 have a symmetrical shape with respect to a line or a plane that bisects the mount plate 321 vertically.

The guide shoulders 3223 and 3233 will be described in more detail below with reference to the drawings.

The upper flange 322 is in close contact with the upper surface 1332 of the accommodation portion 133, and the lower flange 323 is in close contact with the lower surface 1333 of the accommodation portion 133. In addition, when the flow guide 32 is seated in the accommodation portion 133, as illustrated in FIG. 4, the duct flange 324 forms the rear surface of the air duct 102, and the air guide surface 1334 of the accommodation portion 133 forms the front surface of the air duct 102.

When the flow guide 32 is mounted on the accommodation portion 133, the rear flange 325 forms a portion of the rear surface of the mask body 11. In addition, one end portion of the rear flange 325 is in contact with the end portion of the filter housing 34, and the other end portion of the rear flange 325 forms a side end portion of the discharge port 101.

In detail, it can be understood that the discharge port 101 defined as the outlet end of the air duct 102 is defined by an end portion of the air guide surface 1334 constituting the accommodation portion 133 and the other end portion of the rear flange 325.

In addition, a space in which the filter 33 is accommodated is defined by a portion of the mount plate 321, the duct flange 324, the upper flange 322, the lower flange 323, and the rear flange 325.

The upper flange 322 and the lower flange 323 support a portion of an upper side and a portion of a lower side of the four sides of the filter 33, respectively, so that it prevents the filter from being swung in the vertical direction in a state where the user wears the mask apparatus 10.

In addition, the duct flange 324 includes a filter support surface 3241 bent and extended from the side end portion of the mount plate 321 to support a portion of the side of the filter 33, a bent surface 3242 bent and extended from the end portion of the filter support surface 3241, and an air guide surface 3243 rounded with a predetermined curvature at the end portion of the bent surface 3242.

It may be understood that the air guide surface 3243 of the duct flange 324 is formed at a position facing the air guide surface 1334 constituting the accommodation portion 133 and the front and rear surfaces of the air duct 102 are defined by the two air guide surfaces 3243 and 1334.

Due to the rounded shape of the air guide surface 3243, the air duct 102 may have a shape in which a cross-sectional area increases from a suction port communicating with the discharge port of the fan module 31 toward the discharge port 101.

Meanwhile, a guide groove 3201 and a fixing groove 3202 are formed in each of the duct upper flange 3222 of the upper flange 322 and the duct lower flange 3232 of the lower flange 323.

The guide groove 3201 is formed from the bent surface 3242 to any point spaced apart from the rear flange 325 downward. When the flow guide 32 is mounted on the accommodation portion 133, the mounting guide 1332*a* is slidably inserted into the guide groove 3201.

Here, the mounting guide 1332*a* may be formed on the duct upper flange 3222 of the flow guide 32, and the guide groove 3201 may be formed on the upper surface 1332 and the lower surface 1333 of the accommodation portion 133.

Since the mounting guide 1332*a* is inserted into the guide groove 3201, it is possible to prevent a phenomenon that a portion of the air discharged from the fan module 31 to the air duct 102 leaks. Specifically, it is possible to prevent a phenomenon that a portion of the air discharged to the air duct 102 leaks through a gap between the upper surface 1332 of the accommodation portion 133 and the upper flange 322 of the flow guide 32, and a gap between the lower surface 1333 of the accommodation portion 133 and the lower flange 323 of the flow guide 32.

In addition, the fixing guide 1332*b* is press-fitted into the fixing groove 3202, so that the flow guide 32 can be coupled to the accommodation portion 133 without shaking. Of course, the positions of the fixing guide 1332*b* and the fixing groove 3202 may also be interchanged with each other, similarly to the mounting guide 1332*a* and the guide groove 3201.

Meanwhile, a fan support rib 3212 may be formed on the front surface of the mount plate 321, that is, a surface covering the open surface of the fan housing 311.

In detail, the fan support rib 3212 protrudes along the shape of the shroud 3112 constituting the fan housing 311 and extends along the outer surface of the shroud 3112, so that the fan housing 311 can be stably supported. The communication hole 3211 is formed in an inner region of the fan support rib 3212.

In addition, a fan fixing boss 327 may protrude from a front edge of the mount plate 321 corresponding to an outer region of the fan support rib 3212. The fan fixing boss 327 may include a first fan fixing boss formed on an upper edge of the outer side end portion of the mount plate 321 and a second fan fixing boss formed on a lower edge thereof. The outer side end portion of the mount plate 321 may be understood to mean an end portion in close contact with the fastening surface 1335 of the accommodation portion 133.

In addition, a fastening boss 328 protrudes at any point spaced apart from the fan fixing boss 327. The fastening boss 328 may be understood as a means for fixing the flow guide 32 to the seating surface 1331 of the accommodation portion 133.

The fastening boss 328 may include a first fastening boss formed at a point spaced apart from the first fan fixing boss and a second fastening boss formed at a point spaced apart from the second fan fixing boss. It should be noted that the number of the fastening boss 328 and the fan fixing boss 327 is not limited to the presented embodiment.

In addition, a fastening hook 329 may protrude from an outer edge of the front surface of the mount plate 321, that is, a region adjacent to an outer side end portion of the mount plate 321. The fastening hook 329 is caught on the flow guide hook 1339 protruding from the fastening surface 1335 of the accommodation portion 133 to prevent the flow guide 32 from being detached.

Here, the fastening hook 329, the fastening boss 328, and the fan fixing boss 327 may be formed symmetrically with respect to a line dividing the mount plate 321 in the vertical direction.

Meanwhile, in the manufacturing process of the base 3111, when curving of the base 3111 occurs or pressure is applied to the mount plate 321 of the flow guide 32, the PCB F of the fan module 31 interferes with the mount plate 321 and is damaged, or the blade of the fan 312 touches the mount plate 321 to generate noise.

In order to prevent this phenomenon, a curving prevention boss 326 may protrude from one side of the front surface of the mount plate 321. Specifically, the curving prevention boss 326 protrudes from the edge of the front surface of the mount plate 321 adjacent to the duct flange 324.

In addition, in order to prevent the flow of air discharged from the fan module 31 from being obstructed by the curving prevention boss 326, the curving prevention boss 326 is preferably formed on the edge corresponding to the side of the inlet a of the fan module 31 among the edges of the front surface of the mount plate 321.

Therefore, when the flow guide 32 is seated on the shroud 3112 of the fan module 31, the end portion of the curving prevention boss 326 is in contact with the surface of the base corresponding to the inlet a region. (see the dotted circle illustrated in FIG. 15).

By the curving prevention boss 326, a phenomenon which cause any noise due to the interference of the PCB F by the curving of the base 3111 or an external force acting on the mount plate 321, or the contact of the blade of the fan 312 with the mount plate 321 does not occur.

Here, it is not excluded that the curving prevention boss 326 is respectively formed on the upper and lower edges of the front surface of the mount plate 321. In other words, the two curving prevention bosses 326 protrude from positions symmetrical to each other, and it is also possible to be in contact with the inlet a region and the outlet b region.

Figure 17:
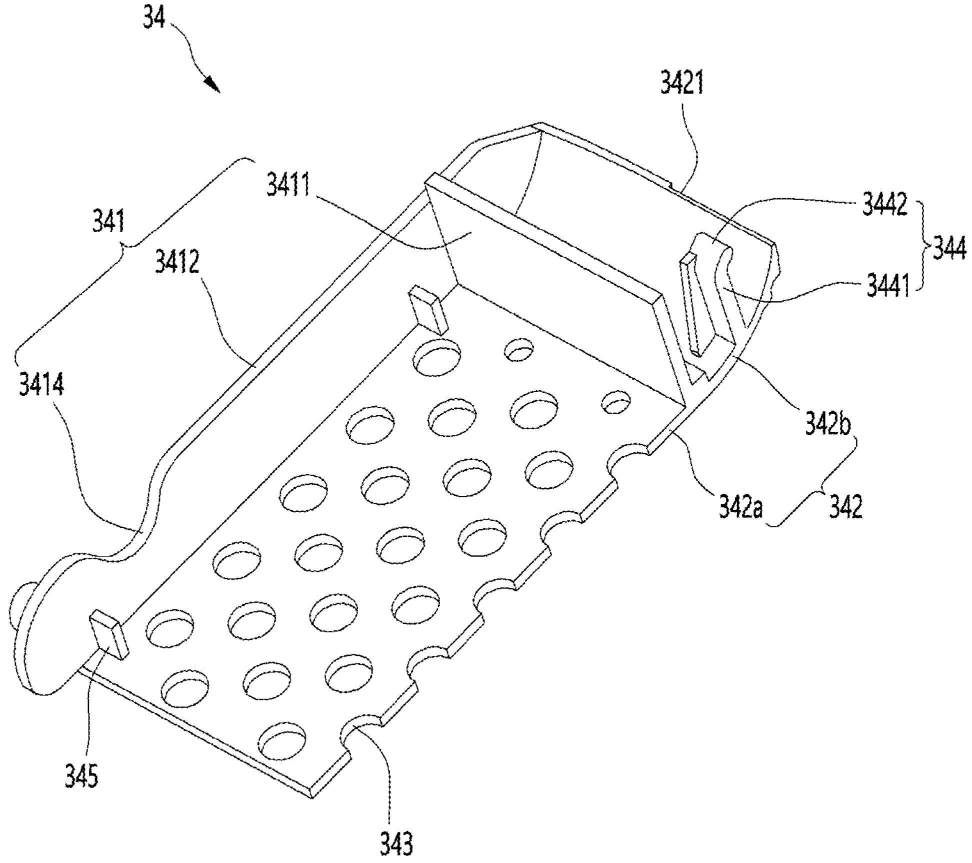
FIG. 17 is a cutaway perspective view of a filter housing according to an embodiment of the present disclosure.
Figure 18:
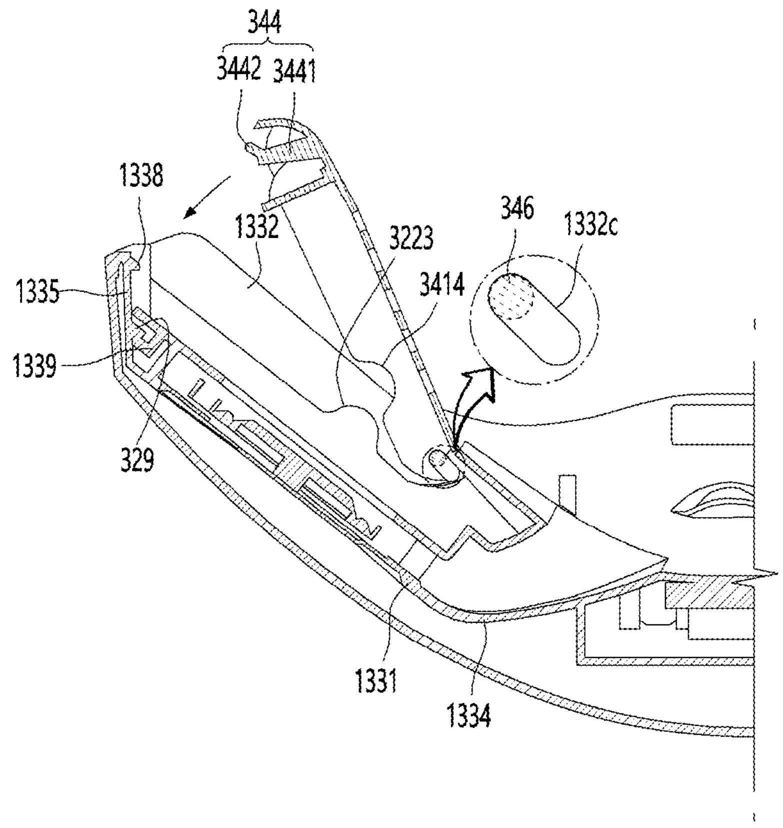
FIGS. 18 to 22 are cross-sectional views sequentially illustrating a closing process of a filter housing according to an embodiment of the present disclosure.
Figure 19:
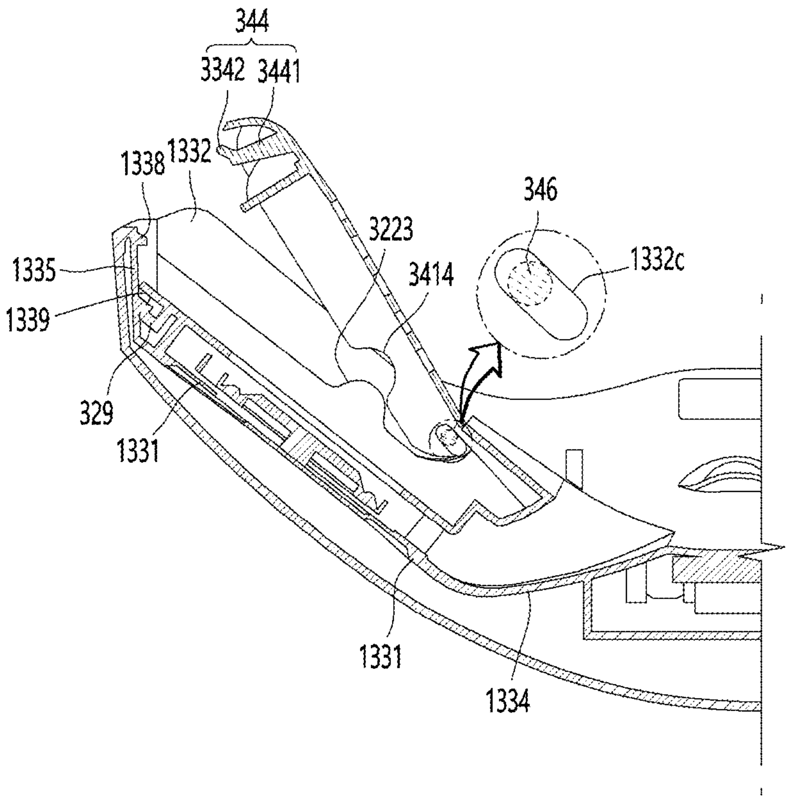
Figure 20:
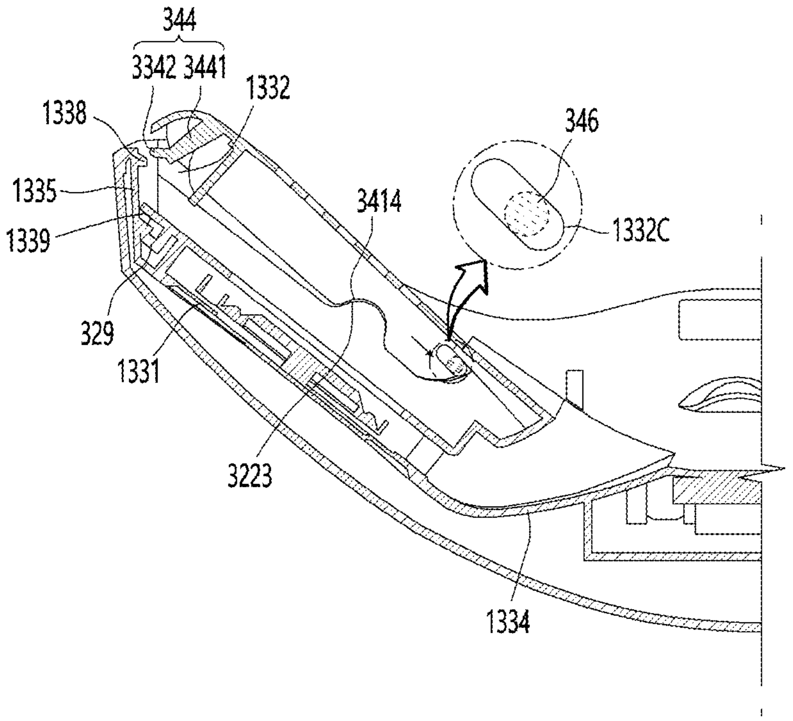
Figure 21:
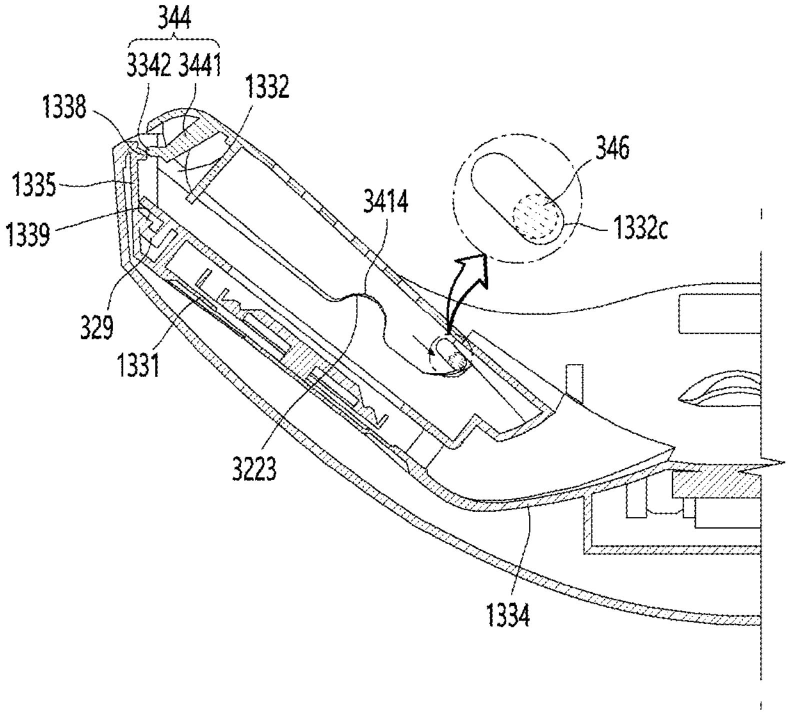

FIG. 17 is a cutaway perspective view of a filter housing according to an embodiment of the present disclosure.

Referring to FIG. 17, the front surface of the filter housing 34 according to the embodiment of the present disclosure faces the rear surface of the filter 33 seated on the rear surface of the flow guide 32, and the rear surface of the filter housing 34 forms a portion of the rear surface of the mask body 11. In other words, when the user wears the mask apparatus 10, the rear surface of the filter housing 34 faces the user's face.

In detail, the filter housing 34 includes a filter frame 341 surrounding three sides of the filter 33, and a filter cover 342 formed on a rear surface of the filter frame 341.

The filter cover 342 can be explained as consisting of a cover body 342*a* on which the suction port 343 is formed and in which the filter frame 341 extends on the front surface, and an extension portion 342*b* extending from one side end portion of the cover body 342*a*.

The extension portion 342*b* may be formed to be smoothly rounded to fit the contour of the rear surface of the mask body 11. The gripping groove 3421 may be formed at an end portion of the extension portion 342*b*. When the filter cover 342 is closed, the gripping groove 3421 is in contact with the gripping groove 1337 (see FIG. 14) formed at the side end portion of the rear body 13.

Figure 22:
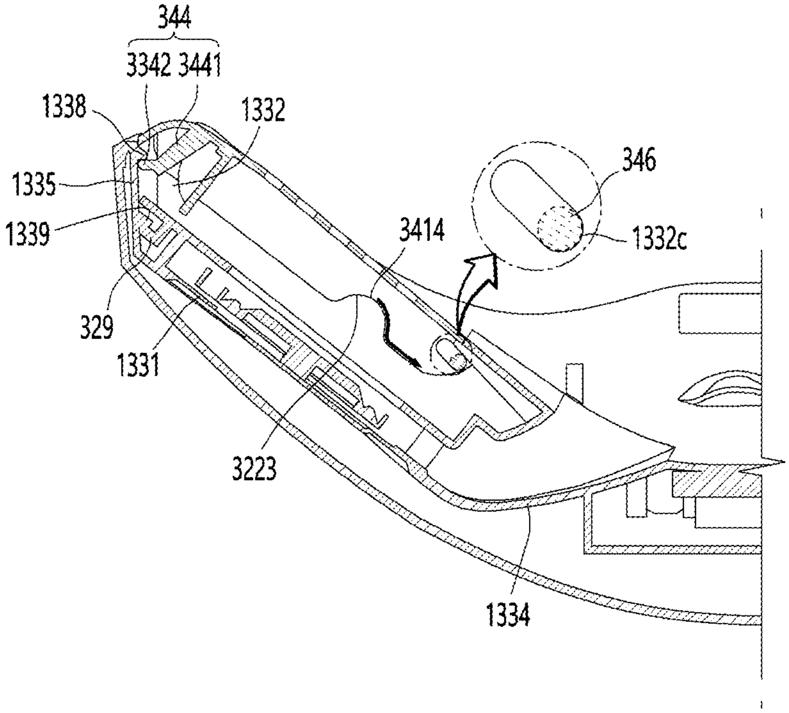

In addition, a fastening hook 344 protrudes from the center of the front surface of the extension portion 342*b*. When the filter cover 342 is closed, the fastening hook 344 is caught by the filter hook 1338 so that the filter cover 342 is fixedly coupled to the rear body 13 (see FIG. 22).

When the filter cover 342 is closed, the rear surface of the filter cover 342 forms a portion of the rear surface of the rear body 13 or a portion of the rear surface of the mask body 11. In other words, a portion of the rear body 13 excluding the opening defining the rear surface of the accommodation portion 133 and the filter cover 342 complete the rear surface of the mask body 11.

Hinges 346 protrude from both sides of the inner end portion of the filter housing 34, that is, the opposite end portion of the extension portion 342*b*. The hinge 346 is inserted into the hinge hole 1332*c* formed in the shape of a long hole and moves between one end and the other end of the hinge hole 1332*c* during the opening and closing process of the filter housing 34.

In detail, the filter frame 341 includes a side frame 3411 extending forward from the front surface of one side end portion of the cover body 342*a*, and an upper frame 3412 extending forward from the front surface of the upper end portion of the cover body 342*a*, and a lower frame formed opposite to the upper frame 3412. Accordingly, only three sides of the filter 33 are surrounded by the filter frame 341.

Guide grooves 3414 are formed in the upper frame 3412 and the lower frame, and guide shoulders 3223 and 3233 of the flow guide 32 are accommodated in the guide groove 3414. When the filter housing 34 is closed after the filter is inserted, the fastening hook 344 of the filter housing 34 are gently caught on filter hook 1338 by the engagement process of the guide groove 3414 and the guide shoulders 3223 and 3233. This will be described in detail below with reference to the drawings.

In addition, the side frame 3411 may be described as an interface dividing the filter cover 342 into the cover body 342*a* and the extension portion 342*b*.

FIGS. 18 to 22 are cross-sectional views sequentially illustrating a closing process of a filter housing according to an embodiment of the present disclosure.

Referring to FIGS. 18 to 22, as described above, the hinge 346 of the filter housing 34 is inserted into the hinge hole 1332*c* in the form of a long hole extending obliquely.

In detail, the user grabs the end of the extension portion 342*b* and lifts it up so that the fastening hook 344 of the filter housing 34 is separated from the filter hook 1338. When the fastening hook 344 is separated from the filter hook 1338, the user grabs the end of the extension portion 342*b* and lifts the end of the extension portion 342*b* up while pulling the end of the extension portion 342*b* toward the side end portion of the mask body 11. Then, as the hinge 346 moves from one end portion of the hinge hole 1332*c* toward the other end portion thereof, the opening angle of the filter housing 34 increases. As a result, the filter housing 34 is opened without interfering with the rear flange 325 of the flow guide 32.

FIG. 18 is a cross-sectional view illustrating a state where the filter housing 34 is maximally opened, wherein the hinge 346 is positioned at the other end of the hinge hole 1332*c*.

In this state, if the filter housing 34 is pushed in until the hinge 346 is in contact with one end of the hinge hole 1332*c* and is not closed, a situation where the hook does not engage may occur while the catching portion 3442 of the fastening hook 344 slides along the outer surface of the hook 1338 may occur. Furthermore, when the user closes the filter housing 34 with excessive force, a phenomenon in which the fastening hook 344 is broken may occur.

According to the present disclosure, even when the user closes the filter housing 34 in a state where the user does not push the hinge 346 in until the hinge touches one end of the hinge hole 1332*c*, a structure in which the fastening hook 344 is accurately coupled to the filter hook 1338 is provided.

As an example, guide shoulders 3223 and 3233 protrude from the flow guide 32 in a round manner, and a guide groove 3414 is formed on a side of the filter housing 34. In addition, when the filter housing 34 is closed, while the guide groove 3414 slides along the rounded surfaces of the guide shoulders 3223 and 3233, the guide shoulders 3223 and 3233 are accurately coupled to the guide groove 3414, and thus the catching portion 3442 of the fastening hook 344 is caught on the inner surface of the filter hook 1338.

As illustrated in FIGS. 18 to 22, as the opening angle of the filter housing 34 gradually decreases, the guide groove 3414 moves to a position where the guide groove 3414 is coupled to the guide shoulders 3223 and 3233. At the same time, the hinge 346 moves from the other end to one end of the hinge hole 1332*c*.

Figure 23:
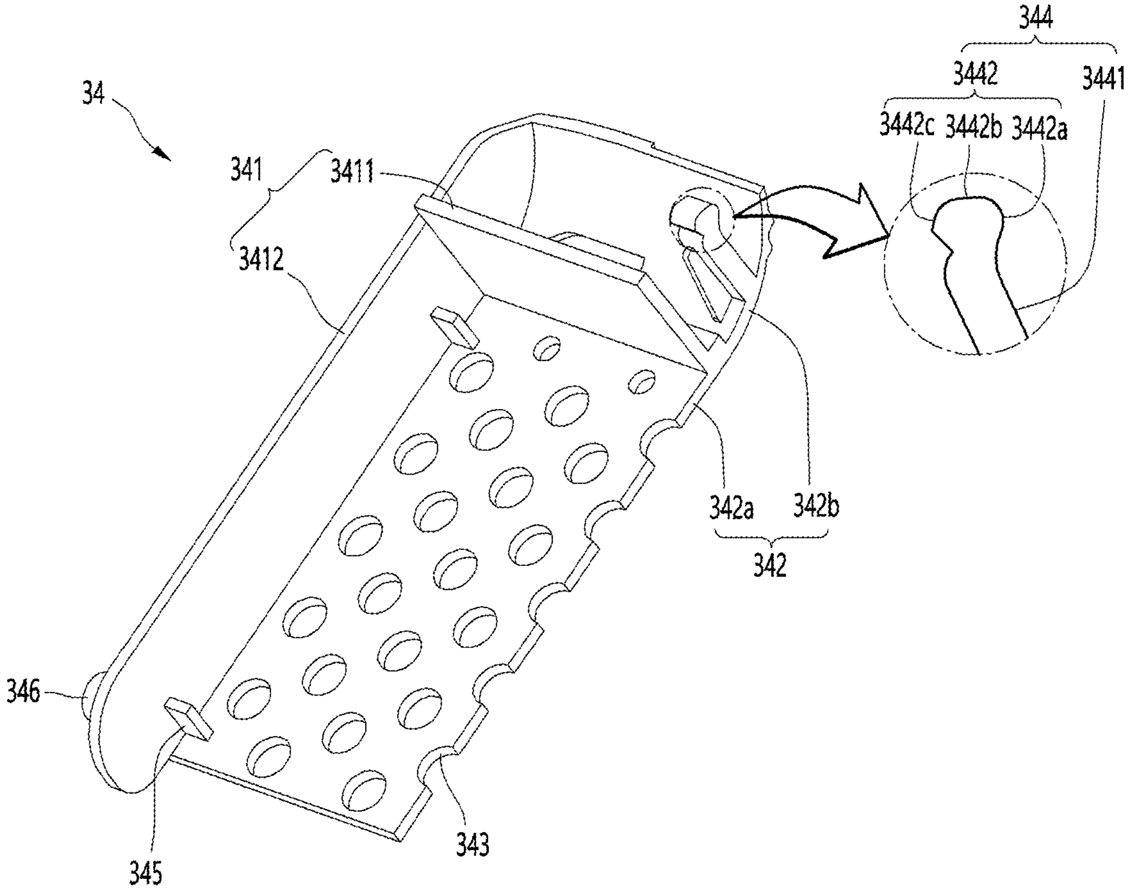
FIG. 23 is a cutaway perspective view of a filter housing according to another embodiment of the present disclosure.

FIG. 23 is a cutaway perspective view of a filter housing according to another embodiment of the present disclosure.

Referring to FIG. 23, guide grooves are not separately formed in the upper frame 3412 and the lower frame 3413 of the filter housing 34 according to another embodiment of the present disclosure, and a guide shoulder is also not formed in the flow guide 32.

However, the shape of the end portion of the fastening hook 344 is improved, so that when the filter housing 34 is closed, the fastening hook 344 and the filter hook 3818 are stably fastened.

In detail, the fastening hook 344 includes an extension portion 3441 extending from the filter cover 342 and a catching portion 3442 formed at an end portion of the extension portion 3441.

The catching portion 3442 includes a catching surface 3442*a* inclined toward the outer edge of the filter housing 34, a sliding surface 3442*b* extending in a straight line form from an end portion of the catching surface 3442*a*, and a contact surface 3442*c* that is rounded with a predetermined curvature at the end portion of the sliding surface 3442*b*.

The contact surface 3442*c* is a surface that is first in contact with the filter hook 1338 when the filter housing 34 is closed.

FIGS. 24 to 28 are cross-sectional views sequentially illustrating a closing process of a filter housing according to another embodiment of the present disclosure.

Referring to FIGS. 24 to 28, in a state where the filter housing 34 is opened, the hinge 346 is in a state of being caught at the other end of the hinge hole 1332*c*.

Figure 24:
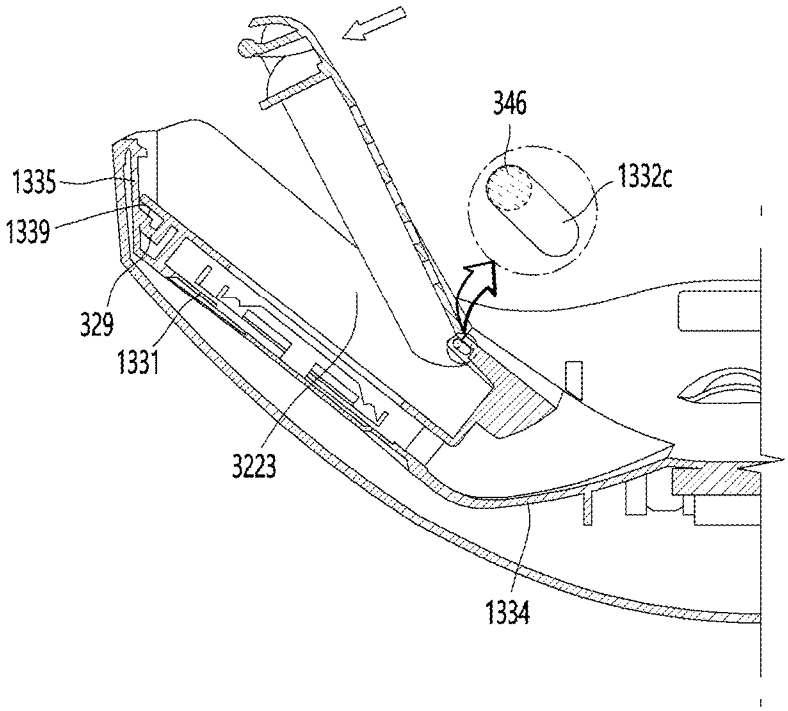
FIGS. 24 to 28 are cross-sectional views sequentially illustrating a closing process of a filter housing according to another embodiment of the present disclosure.
Figure 25:
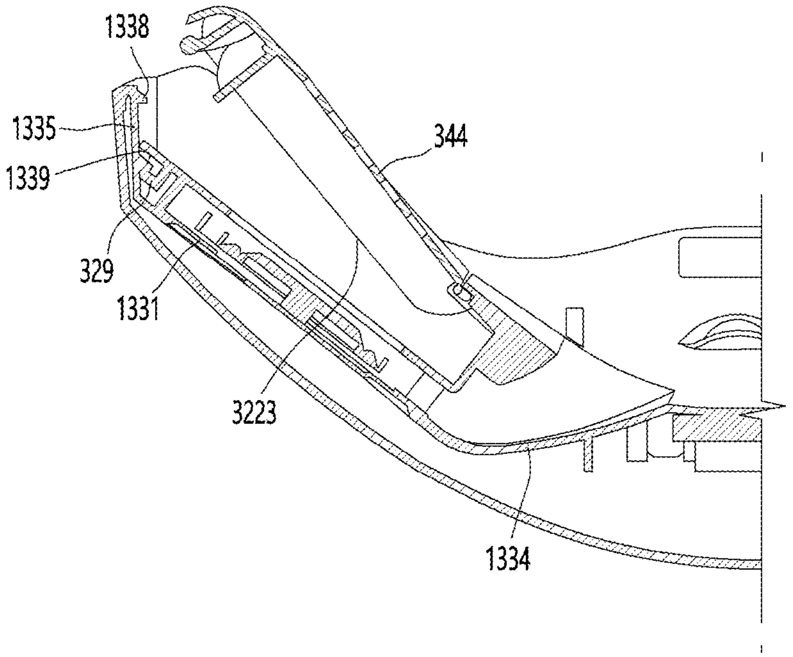
Figure 26:
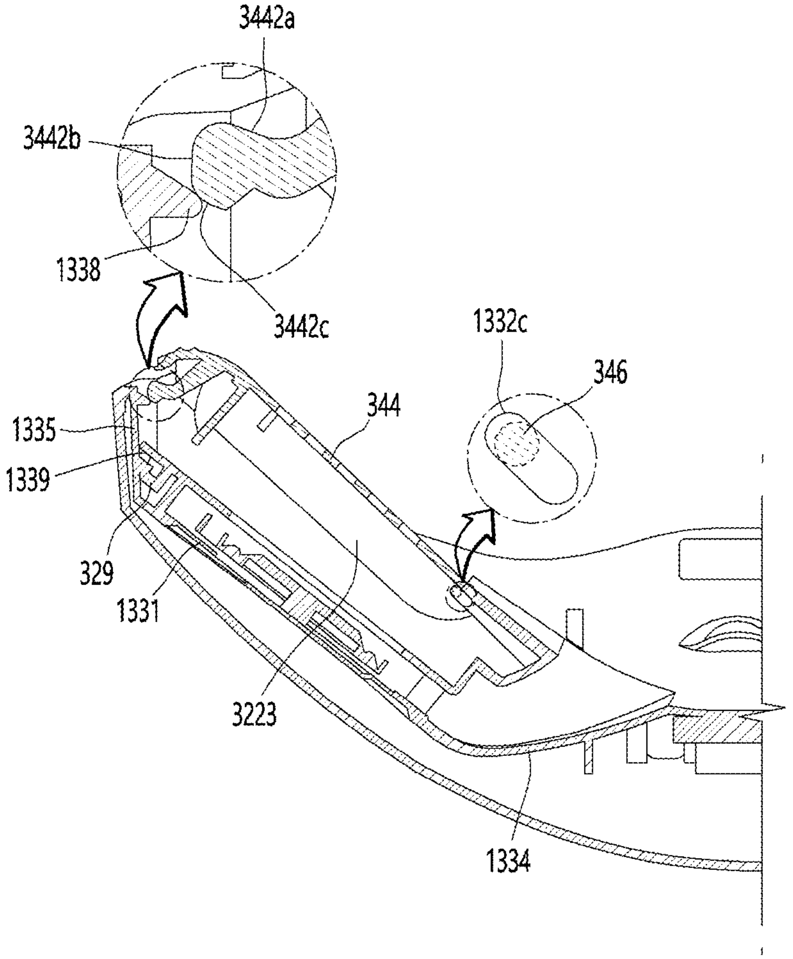

In this state, when the user rotates without pushing the end portion of the filter housing 34 at the side of the hinge 346, that is, when the filter housing 34 is pushed in the direction of the arrow in FIG. 24 and closed, as illustrated in FIG. 26, the tip of the filter hook 1338 is in contact with the contact surface 3442*c*.

Figure 27:
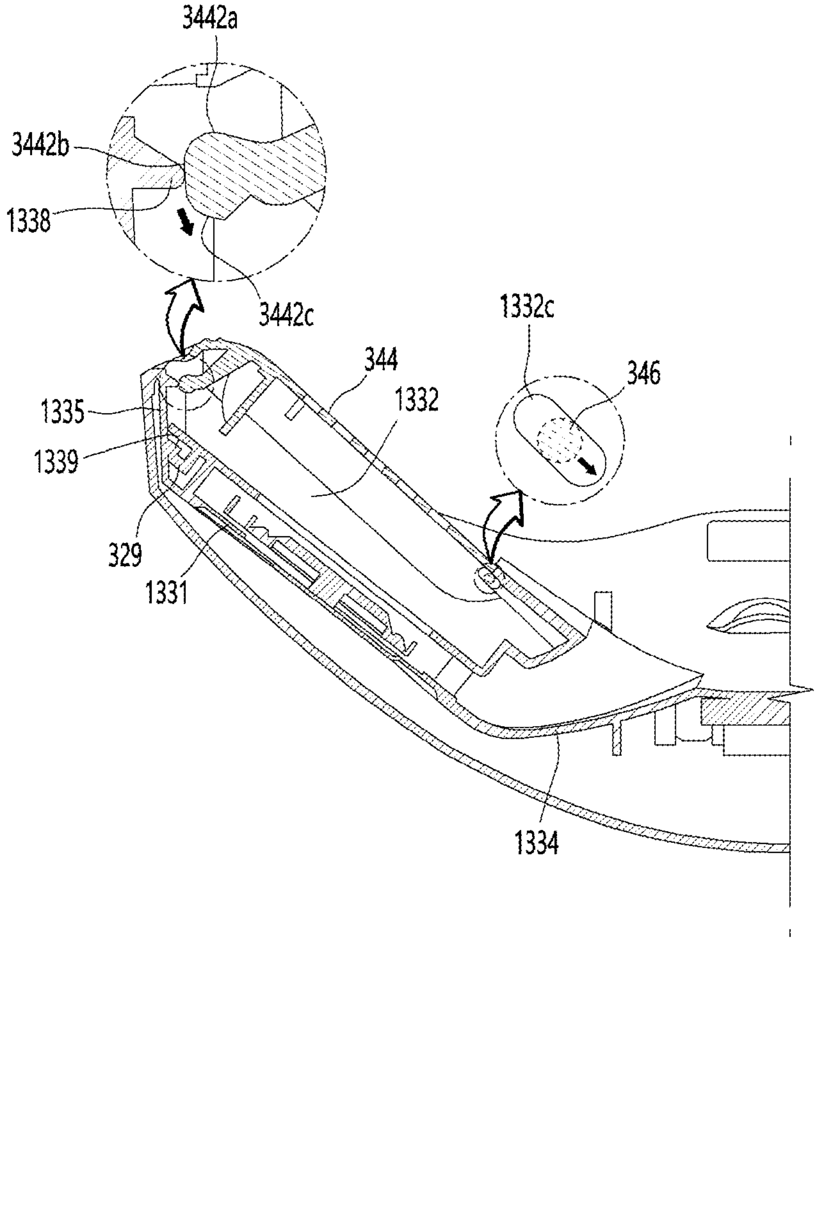
Figure 28:
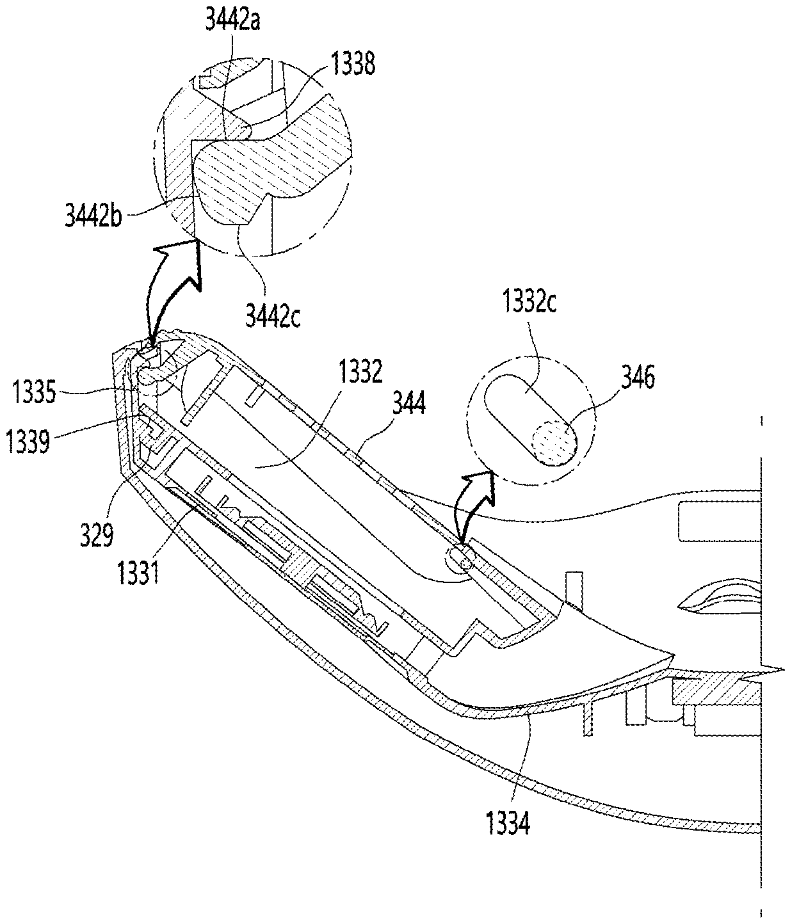

When the rear surface of the filter housing 34 is further pressed while the tip of the filter hook 1338 is in contact with the contact surface 3442*c*, as illustrated in FIG. 27, the tip of the filter hook 1338 reaches the sliding surface 3442*b* while moving along the contact surface 3442*c*. When the tip of the filter hook 1338 moves along the contact surface 3442*c* and the sliding surface 3442*b*, the hinge 346 moves toward one end of the hinge hole 1332*c*.

When the rear surface of the filter housing 34 is completely closed in this state, the inner surface of the filter hook 1338 is in contact with the catching surface 3442*a* with a "click" sound, and the catching portion 3442 is caught on the filter hook 1338.

Due to the shape of the catching portion 3442 of the fastening hook 344, when the user closes the filter housing 34, a phenomenon that the fastening hook 344 is damaged while the end portion of the fastening hook 344 is slid along the outer surface of the filter hook 1338 does not occur.

What is claimed is:

1. A mask apparatus comprising:

a mask body including:

a front body, and a rear body that is coupled to a rear surface of the front body, wherein a pair of accommodation portions protrude from the rear body;

a face guard that is coupled to a rear surface of the rear body, the face guard being configured to contact a user's face and defining a breathing space therein;

a fan module seated in an accommodation portion of the pair of accommodation portions;

a flow guide provided at a rear surface of the fan module and defining a portion of a discharge port configured to communicate with the breathing space;

a filter seated on the flow guide;

a filter housing that is rotatably coupled to the rear body and configured to cover the filter; and a filter hook configured to couple to the filter housing, wherein the flow guide includes:

a mount plate covering a rear surface of a fan housing;

a duct flange that is curved and extends from a first end of the mount plate;

a plurality of upper flanges that are curved and extend from an upper end of the mount plate and an upper end of the duct flange;

a plurality of lower flanges that are curved and extend from a lower end of the mount plate and a lower end of the duct flange; and a rear flange provided at an end portion of the duct flange and defining a portion of a rear surface of the mask body;

wherein a guide shoulder is rounded and protrudes from the duct flange, wherein the filter housing includes:

a plurality of filter frames;

a filter cover provided at a rear surface of each filter frame of the plurality of filter frames;

a hinge protruding from an end portion of a filter frame of the plurality of filter frames; and a fastening hook protruding from an opposite end portion of the filter frame and configured to be caught on the filter hook, and wherein a plurality of guide grooves are defined in the plurality of filter frames, and a guide groove of the plurality of guide grooves is configured to engage with the guide shoulder.

2. The mask apparatus of claim 1, wherein the accommodation portion includes:

a fastening surface protruding forward from a side end portion of the rear body, wherein the filter hook protrudes from a rear surface of the fastening surface;

a seating surface extending from an end portion of the fastening surface toward a center of the rear body and having a rear surface on which the filter is seated;

an air guide surface coupling an end portion of the seating surface and a front surface of the rear body;

an upper surface coupling an upper end of the fastening surface, an upper end of the seating surface, and an upper end of the air guide surface to the front surface of the rear body; and a lower surface coupling a lower end of the fastening surface, a lower end of the seating surface, and a lower end of the air guide surface to the front surface of the rear body.

3. The mask apparatus of claim 2, wherein a hinge hole is defined at each of the upper and lower surfaces, the hinge hole configured to accommodate the hinge, and wherein the hinge hole extends from a front end portion toward a rear end portion of the upper surface, and extends obliquely in a direction closer to the side end portion of the rear body toward a rear end of the rear body.

4. The mask apparatus of claim 2, wherein the air guide surface and the duct flange define an air duct, wherein the plurality of upper flanges include:

a mount upper flange that is curved and extends from the upper end of the mount plate; and a duct upper flange that is curved and extends from the upper end of the duct flange, wherein the plurality of lower flanges include:

a mount lower flange that is curved and extends from the lower end of the mount plate; and a duct lower flange that is curved and extends from the lower end of the duct flange, and wherein the guide shoulder is defined on the mount upper flange and the mount lower flange.

5. The mask apparatus of claim 4, wherein the guide shoulder and the guide groove are defined at a position closer to the hinge than the fastening hook.

6. The mask apparatus of claim 4, wherein the filter cover defines a suction port configured to pass external air, and wherein the suction port comprises a plurality of holes having different sizes.

7. The mask apparatus of claim 6, wherein an end portion of the air duct defines the discharge port configured to discharge the external air to the breathing space.

8. The mask apparatus of claim 2, wherein the fastening surface is configured to contact a second end of the mount plate.

9. The mask apparatus of claim 1, wherein the fan module comprises the fan housing and a fan.

10. The mask apparatus of claim 9, wherein the fan housing comprises a base and a shroud, the shroud protruding forward from an edge of the base by a predetermined height.

11. The mask apparatus of claim 1, wherein the mount plate defines a communication hole configured to pass external air.

12. The mask apparatus of claim 1, wherein the fastening hook comprises an extension portion extending from the filter cover towards a catching portion, the catching portion being defined at an end portion of the extension portion.

13. The mask apparatus of claim 12, wherein the catching portion comprises:

a catching surface that is inclined toward an outer edge of the filter housing;

a sliding surface that extends from an end portion of the catching surface; and a contact surface that has a predetermined curvature and disposed at an end portion of the sliding surface.

14. The mask apparatus of claim 13, wherein when the filter housing is closed, the contact surface is configured to be in contact with the filter hook.

* * * * *